(12) United States Patent
Tanaka et al.

(10) Patent No.: US 9,185,375 B2
(45) Date of Patent: Nov. 10, 2015

(54) COLOR IMAGING ELEMENT AND IMAGING DEVICE

(71) Applicant: FUJIFILM Corporation, Tokyo (JP)

(72) Inventors: Seiji Tanaka, Saitama (JP); Kenkichi Hayashi, Saitama (JP); Noriko Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/589,045

(22) Filed: Jan. 5, 2015

(65) Prior Publication Data

US 2015/0109497 A1 Apr. 23, 2015

Related U.S. Application Data

(63) Continuation of application No. PCT/JP2013/055192, filed on Feb. 27, 2013.

(30) Foreign Application Priority Data

Jul. 6, 2012 (JP) ................................. 2012-152675

(51) Int. Cl.
*H04N 9/64* (2006.01)
*H04N 9/04* (2006.01)
*H04N 9/30* (2006.01)

(52) U.S. Cl.
CPC ............... *H04N 9/646* (2013.01); *H04N 9/045* (2013.01); *H04N 9/30* (2013.01)

(58) Field of Classification Search
CPC ........... H04N 9/04; H04N 9/045; H04N 9/07; H04N 9/083; H04N 2209/045; H04N 2209/047; H04N 9/646; G06T 3/4015
See application file for complete search history.

(56) References Cited

U.S. PATENT DOCUMENTS 3,971,065 A * 7/1976 Bayer ........................... 348/276
5,251,019 A * 10/1993 Moorman et al. ............ 348/275
(Continued)

FOREIGN PATENT DOCUMENTS

JP      8-23543 A    1/1996
JP    11-285012 A   10/1999
(Continued)

OTHER PUBLICATIONS

International Search Report, issued in PCT/JP2013/055192, dated Apr. 9, 2013.
Written Opinion of the International Searching Authority, issued in PCT/JP2013/055192, dated Apr. 9, 2013.

*Primary Examiner* — Timothy J Henn
(74) *Attorney, Agent, or Firm* — Birch, Stewart, Kolasch & Birch, LLP

(57) ABSTRACT

The color imaging element and the imaging device according to the present invention can improve reproduction precision of demosaicing processing in a high frequency region and suppress aliasing. Further, the color imaging element can achieve high resolution by reducing occurrence of color moire (false color). Furthermore, the color imaging element and the imaging device can perform pixel demosaicing processing with high precision. Still furthermore, a basic array pattern including a square pattern and a grating filter line is repeated in a first direction and a second direction, and thus a color filter array can perform signal processing in a subsequent stage according to a repeating pattern of the square pattern and the grating filter line, and can simplify the processing in a subsequent stage more than a conventional random array.

20 Claims, 28 Drawing Sheets

(56) References Cited

U.S. PATENT DOCUMENTS

| | | |
|---|---|---|
| 7,123,299 B1 | 10/2006 | Yoshida et al. |
| 8,111,298 B2 * | 2/2012 | Kameya .................... 348/222.1 |
| 2002/0149686 A1 | 10/2002 | Taubman |
| 2006/0139469 A1 * | 6/2006 | Yokota et al. ................ 348/272 |
| 2006/0203113 A1 * | 9/2006 | Wada et al. .................. 348/302 |
| 2007/0153104 A1 * | 7/2007 | Ellis-Monaghan et al. .. 348/272 |
| 2012/0293694 A1 | 11/2012 | Hayashi et al. |
| 2013/0057736 A1 * | 3/2013 | Wada .......................... 348/280 |

FOREIGN PATENT DOCUMENTS

| | | |
|---|---|---|
| JP | 2000-308071 A | 11/2000 |
| JP | 2000-308080 A | 11/2000 |
| JP | 2005-136766 A | 5/2005 |
| JP | 5054856 B1 | 10/2012 |

* cited by examiner

P6
(BASIC ARRAY PATTERN)

P8
(BASIC ARRAY PATTERN)

COLOR IMAGING ELEMENT AND IMAGING DEVICE

CROSS-REFERENCE TO RELATED APPLICATIONS

This application is a Continuation of PCT International Application No. PCT/JP2013/055192 filed on Feb. 27, 2013, which claims priority under 35 U.S.C. §119(a) to Japanese Patent Application No. 2012-152675 filed on Jul. 6, 2012. Each of the above application(s) is hereby expressly incorporated by reference, in its entirety, into the present application.

BACKGROUND OF THE INVENTION

1. Field of the Invention

The present invention relates to a color imaging element and an imaging device and, in particular, relates to a color imaging element capable of reducing occurrence of color moire and achieving high resolution, and an imaging device using such a color imaging element.

2. Description of the Related Art

In a single-plate color imaging element, a single color filter is provided on each pixel, and hence each pixel has color information about only a single color. For this reason, an output image of a single-plate color imaging element is a RAW image (mosaic image), and thus multichannel images are obtained by a process (demosaicing process) of interpolating a pixel of a missing color from surrounding pixels. What matters in this case is reproduction characteristics of a high frequency image signal. The color imaging element is likely to cause aliasing in a captured image in comparison with a monochrome imaging element, and thus it is important to achieve a high resolution by expanding a reproduction band while reducing occurrence of color moire (false color).

In a primary color Bayer array as a color array of color filters most widely used in the single-plate color imaging elements, green (G) pixels are placed in a checkered pattern, and red (R) and blue (B) pixels are disposed line-sequentially. Thus, there is a problem with reproduction precision when G signals generate high frequency signals in diagonal directions, and when R and B signals generate high frequency signals in horizontal and vertical directions.

Assume a case where a monochrome vertical stripe pattern (high frequency image) as indicated by the (A) portion in FIG. 27 is incident on a color imaging element including color filters in a Bayer array indicated by the (B) portion in FIG. 27. When this pattern is disposed in a Bayer color array and compared for each color, R forms a light and flat color image, B forms a dark and flat color image, and G forms a light and dark mosaic color image as indicated by the (C) to (E) portions in FIG. 27. There is no density difference (level difference) between RGB with respect to the original monochrome image, but the image is colored depending on a color array and an input frequency.

Similarly, assume a case where a diagonally monochrome high frequency image as indicated by the (A) portion in FIG. 28 is incident on an imaging element including color filters of a Bayer array indicated by the (B) portion in FIG. 28. When this pattern is disposed in a Bayer color array and compared for each color, R and B form light and flat color images, and G forms a dark and flat color image as indicated by the (C) to (E) portions in FIG. 28. Assuming that a value of black is 0 and a value of white is 255, the diagonally monochrome high frequency image turns green since only G is 255. Thus, the Bayer array cannot correctly reproduce a diagonal high frequency image.

Generally, in an imaging device using single-plate color imaging elements, optical low pass filters made of a birefringent material such as crystal are placed in front of the color imaging elements to optically reduce a high frequency wave, thereby avoiding this problem. This method can reduce coloring due to aliasing of a high frequency signal, but has a problem that the resolution lowers due to a negative effect of this method.

In order to solve such a problem, a color imaging element has been proposed, wherein a color filter array of the color imaging element is a three-color random array satisfying array limitation conditions in which arbitrary pixels of interest are adjacent to three colors including colors of the pixels of interest on any of four sides of the pixels of interest (Japanese Patent Application Laid-Open No. 2000-308080).

In addition, an image sensor (color imaging element) with a color filter array has been proposed, wherein the image sensor includes a plurality of filters having different spectral sensitivities and in which first filters and second filters are alternately disposed in a first predetermined period in one of diagonal directions of a pixel grid of the image sensor, while the first filters and second filters are alternately disposed in a second predetermined period in the other one of the diagonal directions (Japanese Patent Application Laid-Open No. 2005-136766).

Further, a color array has been proposed, wherein the color array in a color solid state imaging element (color imaging element) of three primary colors of RGB equalizes appearance probabilities of each RGB by disposing sets of three pixels of horizontally-disposed R, G and B in a zig-zag pattern in the vertical direction, and allows arbitrary straight lines (horizontal, vertical and diagonal lines) on an imaging surface to pass through all colors (Japanese Patent Application Laid-Open No. 11-285012).

Furthermore, a color imaging element has been proposed, wherein R and B of the three primary colors of RGB are disposed every third pixel in the horizontal direction and in the vertical direction, and G is disposed between the R and B (Japanese Patent Application Laid-Open No. 8-23543).

SUMMARY OF THE INVENTION

The color imaging element described in Japanese Patent Application Laid-Open No. 2000-308080 needs to optimize each random pattern when demosaicing processing is performed in a subsequent stage since a filter array is random, thus causing a problem of complicating the demosaicing processing. Note that the random array is effective for color moire having a low frequency, but is not effective for a false color in a high frequency portion. As used herein, the term "demosaicing processing" refers to a process of calculating (converting into a synchronous system) all pieces of color information about RGB for each pixel from the RGB mosaic images due to the color filter array of the single-plate color imaging element. The term is also called "demosaicing process" or "synchronization processing" (which has the same meaning in the specification).

In addition, the color imaging element described in Japanese Patent Application Laid-Open No. 2005-136766 has a problem of poor pixel reproduction precision in a limited resolution region (particularly in the diagonal directions), because G pixels (brightness pixels) are placed in a checkered pattern.

The color imaging element described in Japanese Patent Application Laid-Open No. 11-285012 has an advantage capable of suppressing generation of a false color because filters of all colors are located on arbitrary straight lines, but has a problem that high frequency reproducibility thereof is lower than that of the Bayer array because the ratios of the numbers of pixels of RGB are equal. Note that in case of the Bayer array, the ratio of the number of pixels of G, which contributes most to acquisition of a brightness signal, is twice as much as each of the numbers of pixels of R and B.

Meanwhile, the color imaging element described in Japanese Patent Application Laid-Open No. 8-23543 is not effective for a false color in a high frequency portion in a horizontal or vertical direction because the ratio of the number of pixels of G with respect to each of the numbers of pixels of R and B is six times higher than the ratio of the number of pixels of G in the Bayer array, and filter lines of only G pixels are located in the horizontal or vertical direction.

In view of the above circumstances, the present invention has been made, and an object of the present invention is to provide a color imaging element capable of reducing occurrence of false color and achieving high resolution and capable of simplifying the processing in a subsequent stage more than a conventional random array. In addition, another object of the present invention is to provide an imaging device using such a color imaging element.

A color imaging element for achieving the object of the present invention is a single-plate color imaging element including a plurality of pixels composed of photoelectric conversion elements disposed in a first direction and in a second direction perpendicular to the first direction, and color filters disposed on the plurality of pixels, wherein an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction; the basic array pattern includes a first filter corresponding to a first color having one or more colors and a second filter corresponding to a second color having two or more colors, in which a contribution ratio of the second color for acquiring a brightness signal is lower than the contribution ratio of the first color; the basic array pattern includes four or more square patterns corresponding to 3×3 pixels, each square pattern including one of the second filter in the center and eight of the first filters surrounding eight directions of the second filter; the array of the color filters includes therein a grating filter line in the first direction and a grating filter line in the second direction, in which the first filter and the second filter are placed side by side surrounding the four directions of the square pattern; and the array of the color filters includes therein the first filter disposed in each filter line in the first direction and in the second direction of the array of the color filters and in each filter line in a third direction and in a fourth direction inclined with respect to the first direction and the second direction.

A color imaging element for achieving the object of the present invention is a single-plate color imaging element including a plurality of pixels composed of photoelectric conversion elements disposed in a first direction and in a second direction perpendicular to the first direction, and color filters disposed on the plurality of pixels, wherein an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction; the basic array pattern includes a first filter corresponding to a first color having one or more colors, in which a peak transmittance of the first filter is in a range of 480 nm or more and 570 nm or less, and a second filter corresponding to a second color having two or more colors, in which the peak transmittance of the second filter is outside the range; the basic array pattern includes a plurality of square patterns of 3×3 pixels, each square pattern including one of the second filter in the center and eight of the first filters surrounding eight directions of the second filter; the basic array pattern includes four or more square patterns corresponding to 3×3 pixels, each square pattern including one of the second filter in the center and eight of the first filters surrounding eight directions of the second filter; the array of the color filters includes therein a grating filter line in the first direction and a grating filter line in the second direction, in which the first filter and the second filter are placed side by side surrounding the four directions of the square pattern; and the array of the color filters includes therein the first filter disposed in each filter line in the first direction and in the second direction of the array of the color filters and in each filter line in a third direction and in a fourth direction inclined with respect to the first direction and the second direction.

In addition, a color imaging element for achieving the object of the present invention is a single-plate color imaging element including a plurality of pixels composed of photoelectric conversion elements disposed in a first direction and in a second direction perpendicular to the first direction, and color filters disposed on the plurality of pixels, wherein an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction; the basic array pattern includes a first filter corresponding to a first color having one or more colors and a second filter corresponding to a second color having two or more colors, in which a peak transmittance of the second filter is lower than the peak transmittance of the first filter in a range of wavelength from 500 nm or more and 560 nm or less; the basic array pattern includes four or more square patterns of 3×3 pixels, each square pattern including one of the second filter in the center and eight of the first filters surrounding eight directions of the second filter; the basic array pattern includes four or more square patterns corresponding to 3×3 pixels, each square pattern including one of the second filter in the center and eight of the first filters surrounding eight directions of the second filter; the array of the color filters includes therein a grating filter line in the first direction and a grating filter line in the second direction, in which the first filter and the second filter are placed side by side surrounding the four directions of the square pattern; and the array of the color filters includes therein the first filter disposed in each filter line in the first direction and in the second direction of the array of the color filters and in each filter line in a third direction and in a fourth direction inclined with respect to the first direction and the second direction.

In addition, a color imaging element for achieving the object of the present invention is a single-plate color imaging element including a plurality of pixels composed of photoelectric conversion elements disposed in a first direction and in a second direction perpendicular to the first direction, and color filters disposed on the plurality of pixels, wherein an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction; the basic array pattern includes a first filter corresponding to a first color having two or more colors including a color contributing most to a brightness signal among three primary colors and a fourth color other than the three primary colors, and a second filter corresponding to a second color having two or more colors other than the first color; the basic array pattern includes four or more square patterns corresponding to 3×3 pixels, each square pattern including one of the second filter in the center and eight of the first filters surrounding eight directions of the second filter; the array of the color filters includes therein a grating filter line in the first direction and a grating filter line in the second direction, in which the first filter and the second filter are placed side by side surrounding the four directions of the square pattern; and the array of the color filters includes therein the first filter disposed in each filter line in the first direction and in the second direction of the array of the color filters and in each filter line in a third direction and in a fourth direction inclined with respect to the first direction and the second direction.

The present invention provides an array of the color filters in which one or more first filters are placed in a filter line in each direction from the first direction to the fourth direction, and thus can improve reproduction precision of demosaicing processing in a high frequency region.

In addition, the basic array pattern is repeatedly placed in the first direction and in the second direction, and thus the array of the color filters can be processed according to a repeating pattern when a process in a subsequent stage such as demosaicing processing is performed, thereby simplifying the process in a subsequent stage more than a conventional random array.

In addition, the basic array pattern includes square patterns corresponding to 3×3 pixels composed of one of the second filter in the center and eight of the first filters surrounding eight directions of the second filter, and grating filter lines in the first direction and in the second direction, in which the first filter and the second filter are placed side by side surrounding the four directions of the square pattern. Therefore, the geometric regularity due to coupling between the square patterns and the grating filter lines causes the ratio of the number of pixels of the first color corresponding to the first filter to be greater than the ratio of each of the numbers of pixels of each color of the second colors corresponding to the second filters, and at the same time can make it easy to evenly distribute the second filters over the entire color filter array, and can facilitate signal processing in a subsequent stage, thus further improving the image reproduction precision and reliability.

In an embodiment, each value of M and N is 10, the grating filter line in the first direction and in the second direction is 2 pixels wide, and the second filter is disposed every second or third pixel in each of the first direction and the second direction.

In another embodiment, each value of M and N is 8, the grating filter line in the first direction and in the second direction is 1 pixel wide, and the first filter is disposed every second pixel in each of the first direction and the second direction.

It is preferable that in the basic array pattern, the grating filter line in the first direction and the grating filter line in the second direction have the same abundance ratio of a filter of each color of the second color.

It is preferable that at least one filter of the first color is placed adjacent to each side of the four sides of the square pattern, and a filter of each color of the second colors is disposed one by one adjacent to each side of the four sides of the square pattern.

It is preferable that in the array of the color filters, the color of the second filter placed at a center of each square pattern is different from each other among the square patterns closest to each other in each of the first direction and the second direction.

It is preferable that in the array of the color filters, a pixel of each color of the second filter placed at a center of the square pattern has the same abundance ratio.

It is preferable that in the basic array pattern, one or more second filters corresponding to each color of the second colors are placed in each filter line in the first direction and in the second direction in the basic array pattern. This configuration can reduce color moire (false color) which otherwise would occur by an input image having a high frequency component.

It is preferable that the first color includes at least any of green and transparent.

It is preferable that the second color includes red and blue.

The imaging device for achieving the object of the present invention includes an imaging optical system, a color imaging element forming a subject image through the imaging optical system, and an image data generation unit generating image data representing the formed subject image, wherein the color imaging element is a color imaging element according to any of the above aspects.

The color imaging element of the present invention can improve reproduction precision of demosaicing processing in a high frequency region and suppress aliasing. In addition, the color imaging element can achieve high resolution by reducing occurrence of color moire (false color). Further, the color imaging element can perform pixel demosaicing processing with high precision. Furthermore, the basic array pattern composed of square patterns and grating filter lines is repeated in the first direction and the second direction, and thus the color filter array can perform signal processing in a subsequent stage according to a repeating pattern of square patterns and grating filter lines, and can simplify the processing in a subsequent stage more than the conventional random array. Still furthermore, the imaging device of the present invention can reduce occurrence of false color and achieve high resolution, and can simplify the processing in a subsequent stage more than the conventional random array.

DETAILED DESCRIPTION OF THE EMBODIMENTS

Figure 1:
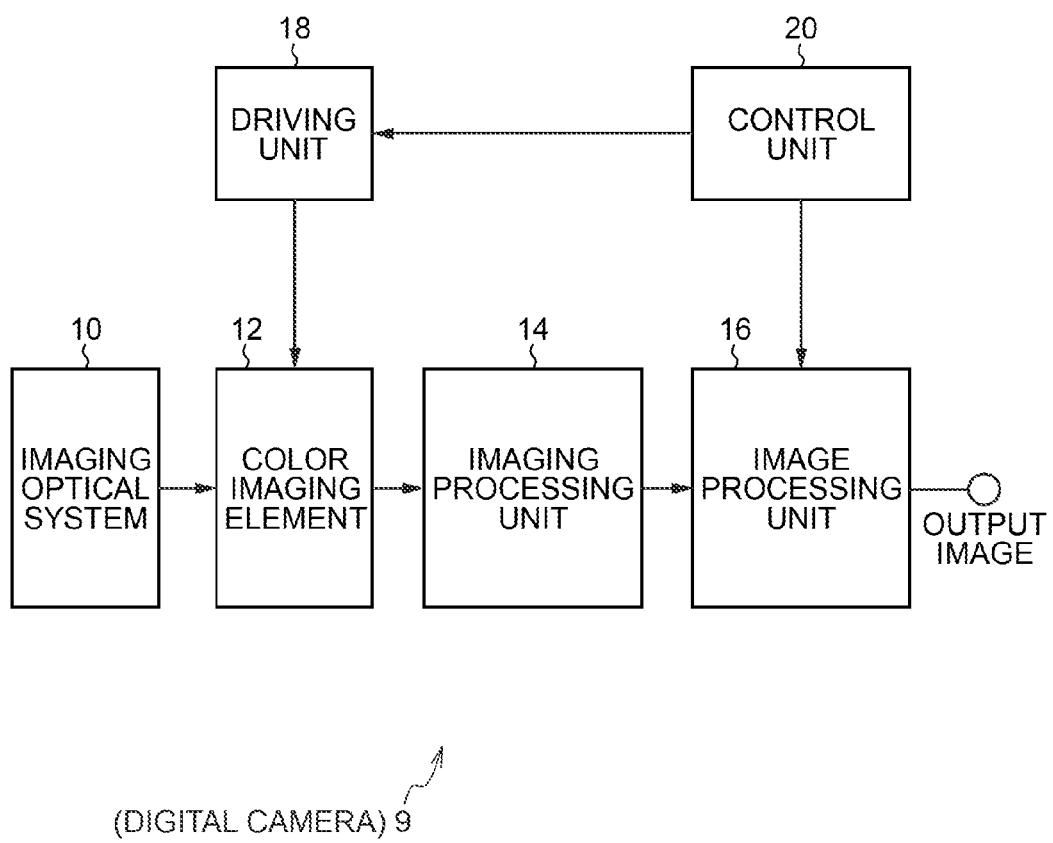
FIG. 1 is a block diagram illustrating an electrical configuration of a digital camera.

FIG. 1 is a block diagram illustrating a digital camera 9 having a color imaging element according to the present invention. The digital camera 9 is roughly divided into an imaging optical system 10, a color imaging element 12, an imaging processing unit 14, an image processing unit 16, a driving unit 18, a control unit 20, and the like.

The imaging optical system 10 forms a subject image on an imaging plane of the color imaging element 12. The color imaging element 12 is a so-called single-plate color imaging element including a plurality of pixels composed of photoelectric conversion elements arrayed (two-dimensionally arrayed) in a horizontal direction and a vertical direction in Figure on the imaging plane; and color filters provided above a light receiving plane of each pixel. As used herein, the terms "upper" and "above" refer to a direction from which subject light is incident on the imaging plane of the color imaging element 12.

The subject image formed on the color imaging element 12 is converted into a signal charge corresponding to the amount of incident light by the photoelectric conversion element of each pixel. Signal charges accumulated in each photoelectric conversion element are sequentially read from the color imaging element 12 as voltage signals (image signals) corresponding to the signal charges based on a driving pulse provided by the driving unit 18 in response to a command of the control unit 20. The image signals read from the color imaging element 12 are R, G, and B signals indicating red (R), green (G) and blue (B) mosaic images corresponding to the color filter array of the color imaging element 12. Note that the color imaging element 12 may be another type of imaging element such as a CCD (Charge Coupled Device) type imaging element and a CMOS (Complementary Metal Oxide Semiconductor) type imaging element.

The image signals read from the color imaging element 12 are inputted to the imaging processing unit 14. The imaging processing unit 14 includes a correlated double sampling circuit (CDS) for removing reset noise included in the image signals; an AGC circuit for amplifying an image signal and controlling the image signal at a certain level of magnitude; and an A/D converter. This imaging processing unit 14 performs correlated double sampling processing on the inputted image signal and amplifies the image signal, and then outputs RAW data obtained by converting the image signal into a digital image signal, to the image processing unit 16. Note that in a case where the color imaging element 12 is a MOS type imaging element, the A/D converter is usually housed in the imaging element, and thus the correlated double sampling processing may not be required.

The image processing unit 16 includes a white balance correction circuit; a gamma correction circuit; a demosaicing processing circuit (a processing circuit which calculates (converts to a simultaneous type) all pieces of color information of RGB for each pixel from RGB mosaic images related to the color filter array of the single-plate color imaging element 12); a brightness/color difference signal generation circuit; an outline correction circuit; a color correction circuit; and the like. In response to a command from the control unit 20, the image processing unit 16 performs a required signal processing on RAW data of the mosaic image inputted from the imaging processing unit 14 to generate RGB pixel signals having color information about all RGB for each pixel. Then, based on these signals, the image processing unit 16 generates image data (YUV data) composed of brightness data (Y data) and color difference data (Cr and Cb data).

Of the image data generated by the image processing unit 16, a still image is subjected to compression processing conforming to the JPEG standards, and a moving image is subjected to compression processing conforming to the MPEG2 standards by a compression/extension processing circuit. Then, the image data is recorded in an unillustrated recording medium (e.g., a memory card) and is outputted to be displayed on display means (not illustrated) such as a liquid crystal monitor. Note that in the present embodiment, the recording medium is not limited to the recording medium attachable to and detachable from the digital camera 9, but may be a built-in magneto-optical recording medium, and the display means is not limited to the means housed in the digital camera 9, but may be an external display connected to the digital camera 9.

[Color Imaging Element]

Figure 2:
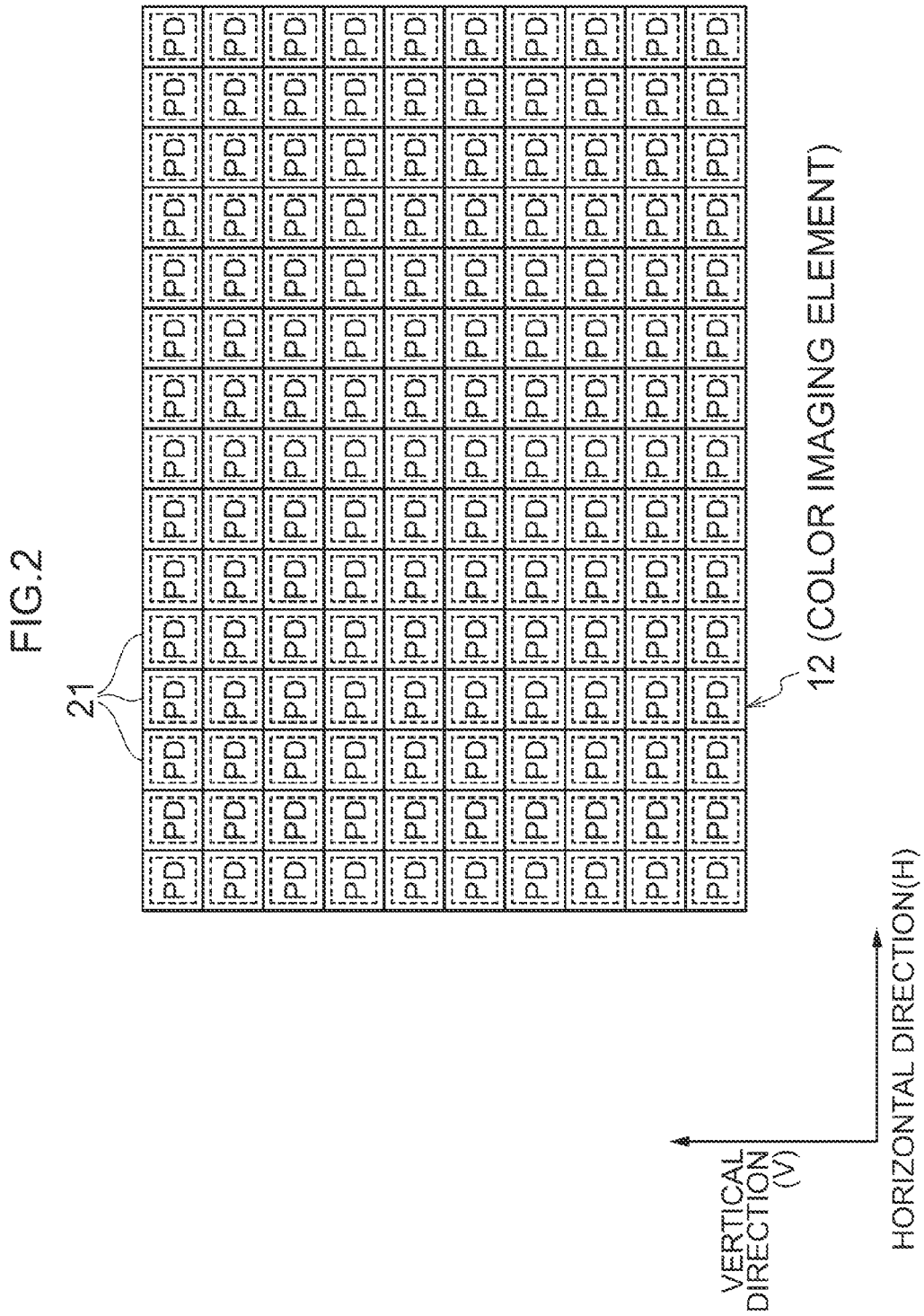
FIG. 2 is a front view of an imaging plane of a color imaging element.

As illustrated in FIG. 2, the imaging plane of the color imaging element 12 includes thereon a plurality of pixels 21 including photoelectric conversion elements PD two-dimensionally arrayed in a horizontal direction and in a vertical direction. As used herein, the term "horizontal direction" corresponds to one direction of the first direction and the second direction of the present invention, and the term "vertical direction" corresponds to the other direction of the first direction and the second direction of the present invention.

Figure 3:
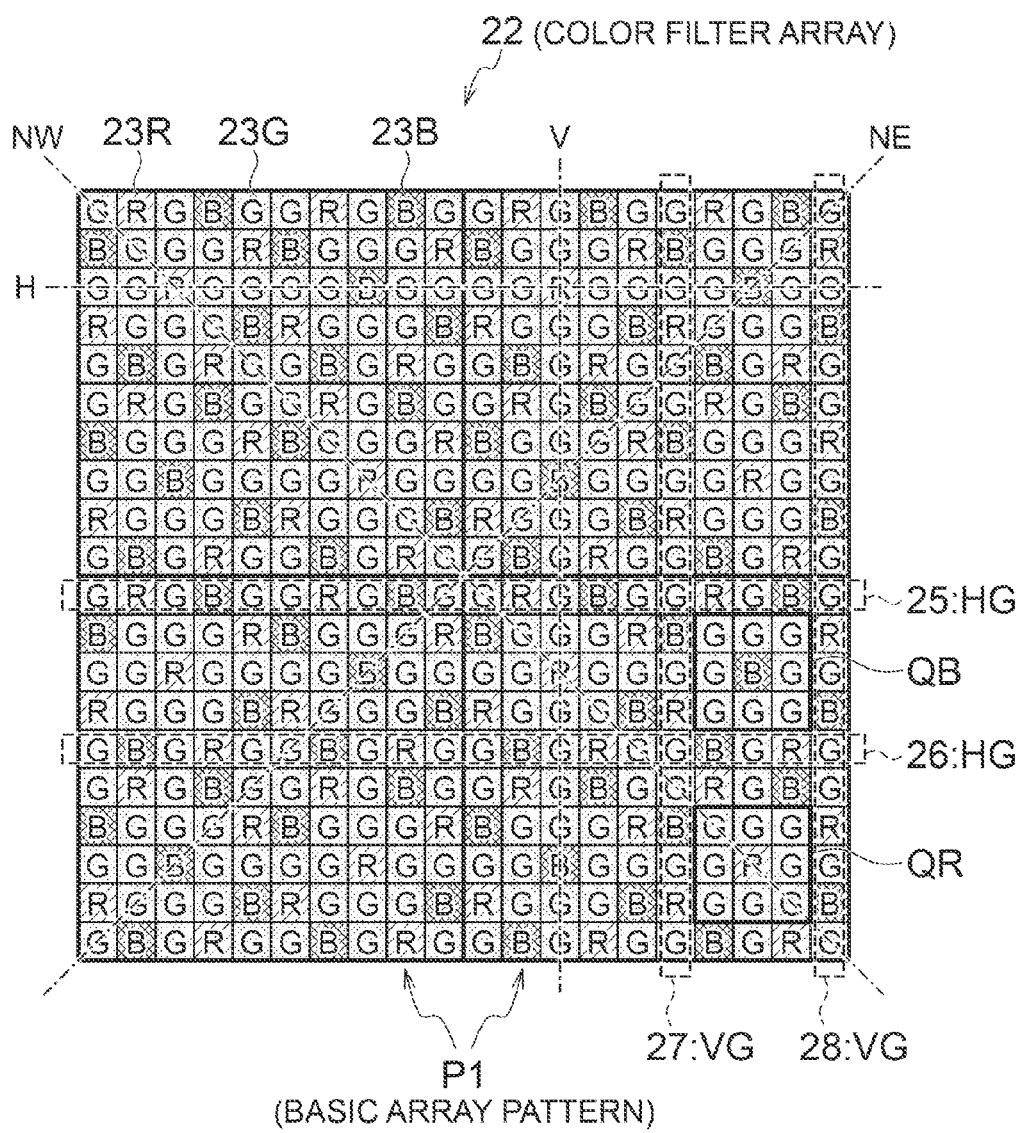
FIG. 3 is a front view of a color filter array according to a first embodiment.

As illustrated in FIG. 3, the imaging plane of the color imaging element 12 includes thereon a color filter array 22 including a color filter provided on each pixel 21. The color filter array 22 includes color filters 23R, 23G, and 23B (hereinafter referred to as an R filter, a G filter, and a B filter respectively) corresponding to three primary colors of red (R), green (G), and blue (B) respectively. Each pixel 21 includes thereon any of the R filter 23R, the G filter 23G, and the B filter 23B. Hereinafter, a pixel having the R filter 23R disposed thereon is referred to as an "R pixel", a pixel having the G filter 23G disposed thereon is referred to as a "G pixel", and a pixel having the B filter 23B disposed thereon is referred to as a "B pixel".

As used herein, the G color corresponds to the first color of the present invention, and the G filter 23G corresponds to the first filter of the present invention. In addition, the R color and the B color correspond to the second color of the present invention; and the R filter 23R and the B filter 23B correspond to the second filter of the present invention. Note that in the following description, any filter of the R filter 23R and the B filter 23B belonging to the second color filter are also referred to as an "RB filter".

[Color Filter Array According to First Embodiment]

The color filter array 22 has the following features (1), (2), (3), (4), (5), (6), and (7).

[Feature (1)]

Figure 4:
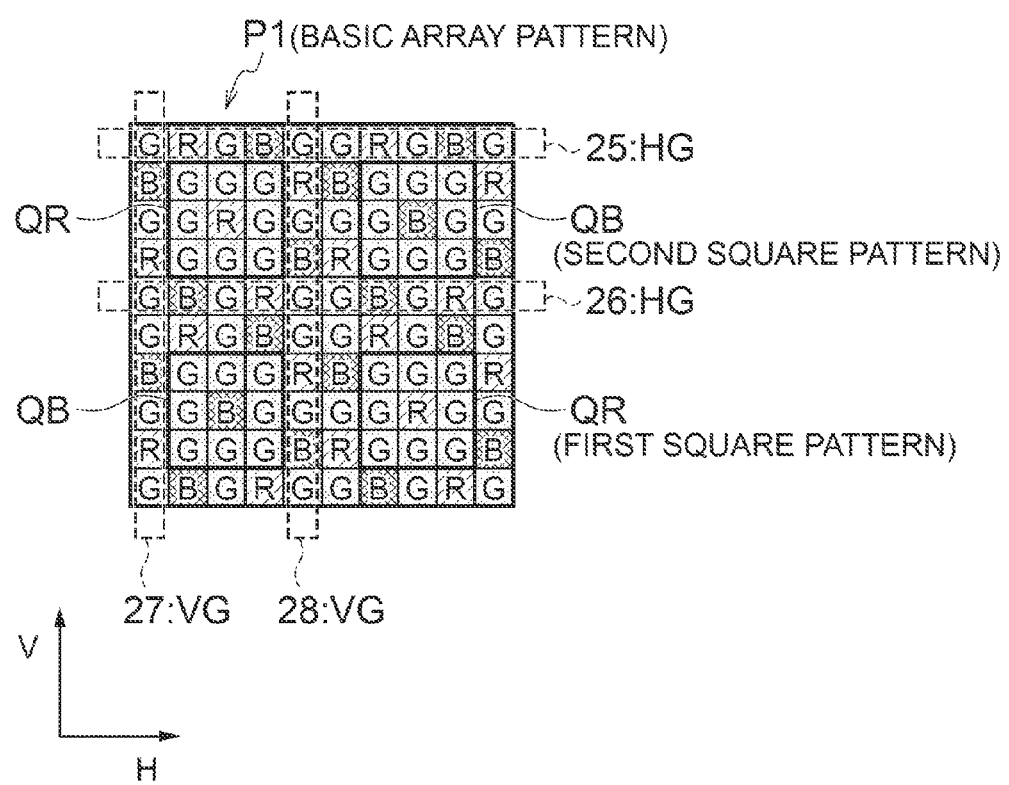
FIG. 4 is an enlarged view of a basic array pattern in FIG. 3.

As illustrated in FIGS. 3 and 4, the color filter array 22 includes basic array patterns P1, each of which is a square array pattern corresponding to 10×10 pixels, wherein the basic array pattern P1 is repeatedly placed in the first direction H (horizontal direction) and in the second direction V (vertical direction). Specifically, in the color filter array 22, the R filter 23R, the G filter 23G, and the B filter 23B of each color are periodically disposed. For this reason, the R, G, and B signals read from the color imaging element 12 can be subjected to demosaicing processing and other processing according to a repeating pattern. As a result, the color filter array 22 can simplify processing in a subsequent stage more than the conventional random array.

In addition, when thinning processing is performed in units of the basic array patterns P1 to reduce an image, the color filter array after the thinning processing is the same as the color filter array before the thinning processing, thus allowing a common processing circuit to be used.

The basic array pattern P1 includes color filters (the R filter 23R, the G filter 23G, and the B filter 23B) which are decisively disposed so as to satisfy the features (2) to (7).

[Feature (2)]

The color filter array 22 includes therein one or more G filters 23G (first filters) in each filter line of a first direction H, a second direction V, a third direction NE, and a fourth direction NW. In the present embodiment, the first direction H designates the horizontal direction, the second direction V designates the vertical direction, the third direction NE designates a lower-left-to-upper-right diagonal direction, and the fourth direction NW designates an upper-left-to-lower-right diagonal direction. The first direction H is orthogonal to the second direction V. The third direction NE and the fourth direction NW are inclined at an angle of 45° with respect to each of the first direction H and the second direction V. This is because a plurality of pixels and color filters are placed in a square grid pattern in the horizontal direction and in the vertical direction. Thus, when a plurality of pixels and color filters are placed in a rectangular grid pattern, the direction of the diagonal line of the rectangular grid corresponds to the lower-left-to-upper-right diagonal direction and the upper-left-to-lower-right diagonal direction.

The contribution ratio of the G color for acquiring a brightness (Y) signal (above-described brightness data) is higher than the contribution ratio of the R color and the B color. In other words, the contribution ratio of the R color and the B color is lower than the contribution ratio of the G color. More specifically, in response to a command from the control unit 20, the above-described image processing unit 16 performs required signal processing on RAW data of a mosaic image inputted from the imaging processing unit 14 to generate an RGB pixel signal having color information about all RGB for each pixel. Then, based on the RGB pixel signal, the image processing unit 16 generates a Y signal according to the following expression (1). The following expression (1) is commonly used to generate the Y signal in the color imaging element 12. According to the expression (1), the contribution ratio of the G color is 60%. Consequently, the contribution ratio of the G color is higher than the contribution ratio of the R color (contribution ratio of 30%) and the B color (contribution ratio of 10%). Accordingly, the G color contributes most to the brightness signal among the three primary colors.

$$Y=0.3R+0.6G+0.1B \qquad \text{Expression (1)}$$

Such a G filter 23G is disposed in each filter line in the first direction H, in the second direction V, in the third direction NE, and in the fourth direction NW of the color filter array 22, which can improve reproduction precision of demosaicing processing in a high frequency region regardless of the direction of the high frequency in an input image.

[Feature (3)]

The number of pixels of the R pixel, the G pixel, and the B pixel corresponding to the RGB filters 23R, 23G, and 23B in the basic array pattern P1 is 18 pixels, 64 pixels, and 18 pixels respectively. In other words, the ratio of the number of each pixel of the RGB pixels is 9:32:9. Thus, the ratio of the number of pixels of the G pixel contributing most to obtainment of the brightness signal is greater than the ratio of the number of pixels of each of the R pixel and the B pixel.

As described above, the ratio of the number of G pixels is different from the ratio of the number of each of the R and B pixels and particularly the ratio of the number of the G pixels contributing most to obtainment of the brightness signal is greater than the ratio of the number of each of the R and B pixels, which can suppress aliasing at demosaicing processing and improve high frequency reproducibility.

[Feature (4)]

In the basic array pattern P1, one or more R filters 23R and B filters 23B are placed in each filter line in the first direction H and in the second direction V of the color filter array 22.

The R filters 23R and the B filters 23B are placed in each filter line in the first direction H and in the second direction V of the color filter array 22, which can reduce occurrence of color moire (false color). This can prevent an optical low pass filter for suppressing occurrence of a false color from being disposed in an optical path from an incident plane of the imaging optical system 10 to the imaging plane of the color imaging element 12. In addition, when the optical low pass filter is applied, the optical low pass filter may be an optical low pass filter having a weak function to cut a high frequency component to prevent the occurrence of a false color. As a result, the resolution can be prevented from being lowered.

[Feature (5)]

The G filter 23G or the B filter 23B is placed adjacent to the R filter 23R satisfying the above feature (4) in each direction of the first direction H, the second direction V, the third direction NE, and the fourth direction NW (hereinafter referred to as each direction (H, V, NE, and NW) as needed). In addition, the G filter 23G or the R filter 23R is placed adjacent to the B filter 23B satisfying the above feature (4) in each direction (H, V, NE, and NW). Accordingly, a different color filter is placed adjacent to the R filter 23R and the B filter 23B in each direction (H, V, NE, and NW). In other words, the same R filters 23R or the same B filters 23B are not placed adjacent to each other in each direction (H, V, NE, and NW).

As described above, when the RB filters 23R and 23B are disposed so as to satisfy the above features (4) and (5) in the color filter array 22, the RB filters 23R and 23B are evenly distributed in the color filter array 22, which can perform demosaicing processing on the R pixels and the B pixels with high precision.

Note that it is preferable that one or more R filters 23R and B filters 23B are placed on filter lines in the third direction NE and in the fourth direction NW of the color filter array 22. More specifically, it is preferable that the filter lines including the R filters 23R and the B filters 23B are periodically placed adjacent to each other in each diagonal direction (the third direction NE and the fourth direction NW). In other words, the filter lines in the diagonal directions (NE and NW) including the R filters 23R and the B filters 23B are placed adjacent to each other at a high rate, which can effectively suppress color moire (false color) which otherwise would occur by an input image having a high frequency component. As used herein, the expression "the filter lines are adjacent in the diagonal directions" means that the distance between a filter line and a filter line is √2/2 pixel spacing, assuming that the length of one side of the square filter is 1. In the color filter array 22 of FIG. 3, there is a filter line having only one of the R filter 23R and the B filter 23B in the diagonal directions (the third direction NE and the fourth direction NW) (which means that there is a filter line having no R filter 23R or there is a filter line having no B filter 23B). The rate of such filter lines having only one of the R filter 23R and the B filter 23B is 1/5 in each direction of the NE and NW.

Figure 5:
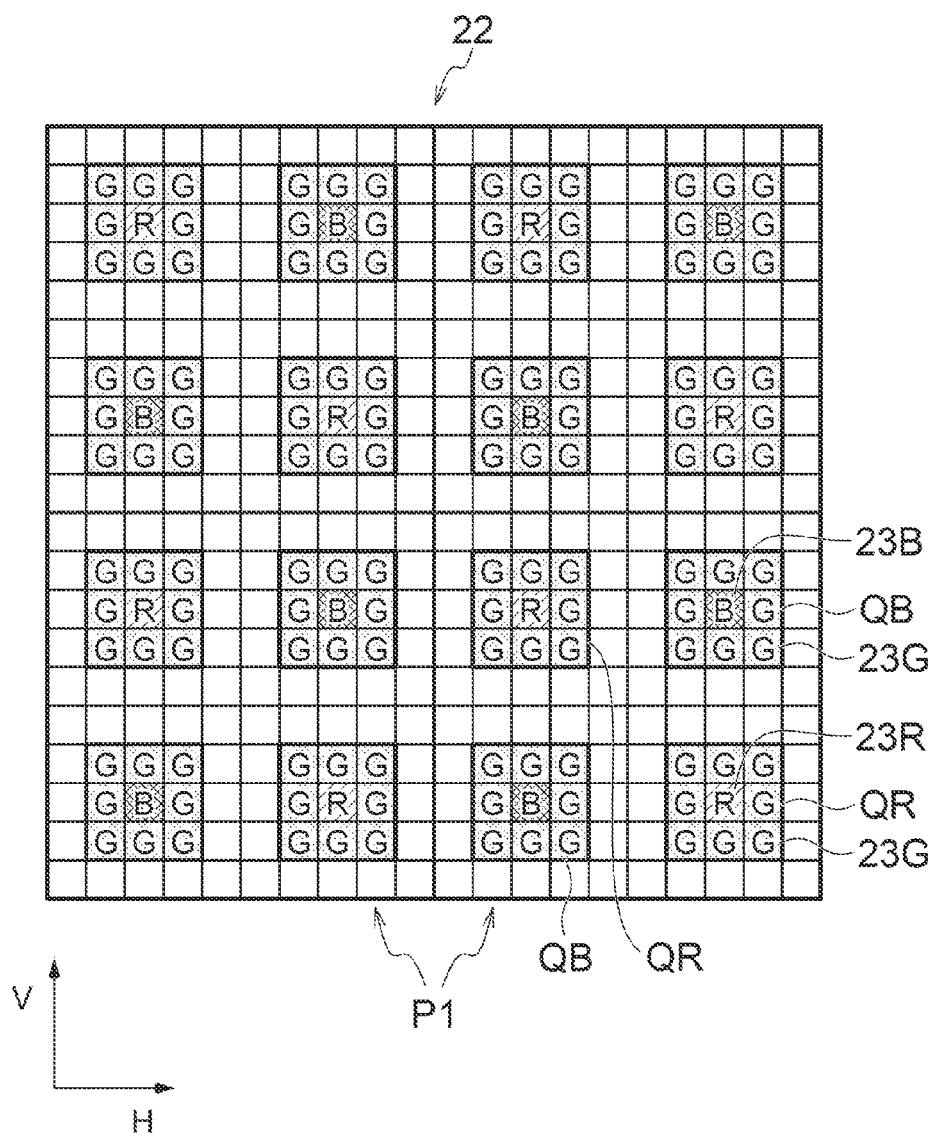
FIG. 5 is an explanatory drawing explaining a square pattern in FIG. 3.

As illustrated in FIGS. 3, 4, and 5 (explanatory drawings of the square pattern), the color filter array 22 of the present embodiment has the following feature (6).

[Feature (6)]

As illustrated in FIG. 4, the basic array pattern P1 includes four square patterns (QR and QB) corresponding to 3×3 pixels. One square pattern QR or QB includes one second filter (R filter 23R or B filter 23B) placed at the center and eight of the first filters (G filters 23G) disposed surrounding the eight directions of the second filter (23R or 23B). More specifically, the G filter 23G is placed adjacent to the center filter 23R or 23B in each direction of above, diagonally upper right, right, diagonally lower right, below, diagonally lower left, left, and diagonally upper left in FIG. 4.

The basic array pattern P1 of the present embodiment includes two square patterns QR (first square pattern) each having an R filter 23R placed at the center and two square patterns QB (second square pattern) each having a B filter 23B placed at the center. In the following description, the two types of square patterns "QA" and "QB" may collectively be called a square pattern "Q" as needed.

Only the G pixels are extracted from the 3×3 pixels corresponding to such square patterns Q to calculate a difference absolute value of pixel values of a plurality of G pixels in the first direction H, a difference absolute value of pixel values of a plurality of G pixels in the second direction V, a difference absolute value of pixel values of a plurality of G pixels in the third direction NE, and a difference absolute value of pixel values of a plurality of G pixels in the fourth direction NW, which can determine that there is a correlation in the direction having the smallest difference absolute value among the first direction H, the second direction V, the third direction NE, and the fourth direction NW. Thus, the color filter array 22 can use information about the G pixel having a minimum pixel spacing in the square pattern Q to determine a highly correlated direction among the first direction H, the second direction V, the third direction NE, and the fourth direction NW. The direction determination result can be used for a process (demosaicing processing) of interpolating from the surrounding pixels. Note that in this case, for example, a direction determination unit may be provided in the above-described image processing unit 16 (including the demosaicing processing circuit) to determine the direction.

In addition, the square pattern Q of the present embodiment has the following additional features (6-1) and (6-2).

[Feature (6-1)]

In the color filter array 22, the first square pattern QR and the second square pattern QB are placed so as not to close to each other in each direction of the first direction H and the second direction V. More specifically, the colors (R and B) of the RB filters (23R and 23B) placed at the center of the respective square patterns Q are different from each other among the mutually closest square patterns Q in each direction of the first direction H and the second direction V.

[Feature (6-2)]

In the color filter array 22, the RB filters (23R and 23B) placed at the center of the respective square patterns Q have the same abundance ratio of the respective colors (R and B). In other words, in the color filter array 22, the number of the first square patterns QR is equal to the number of the second square patterns QB.

Figure 6:
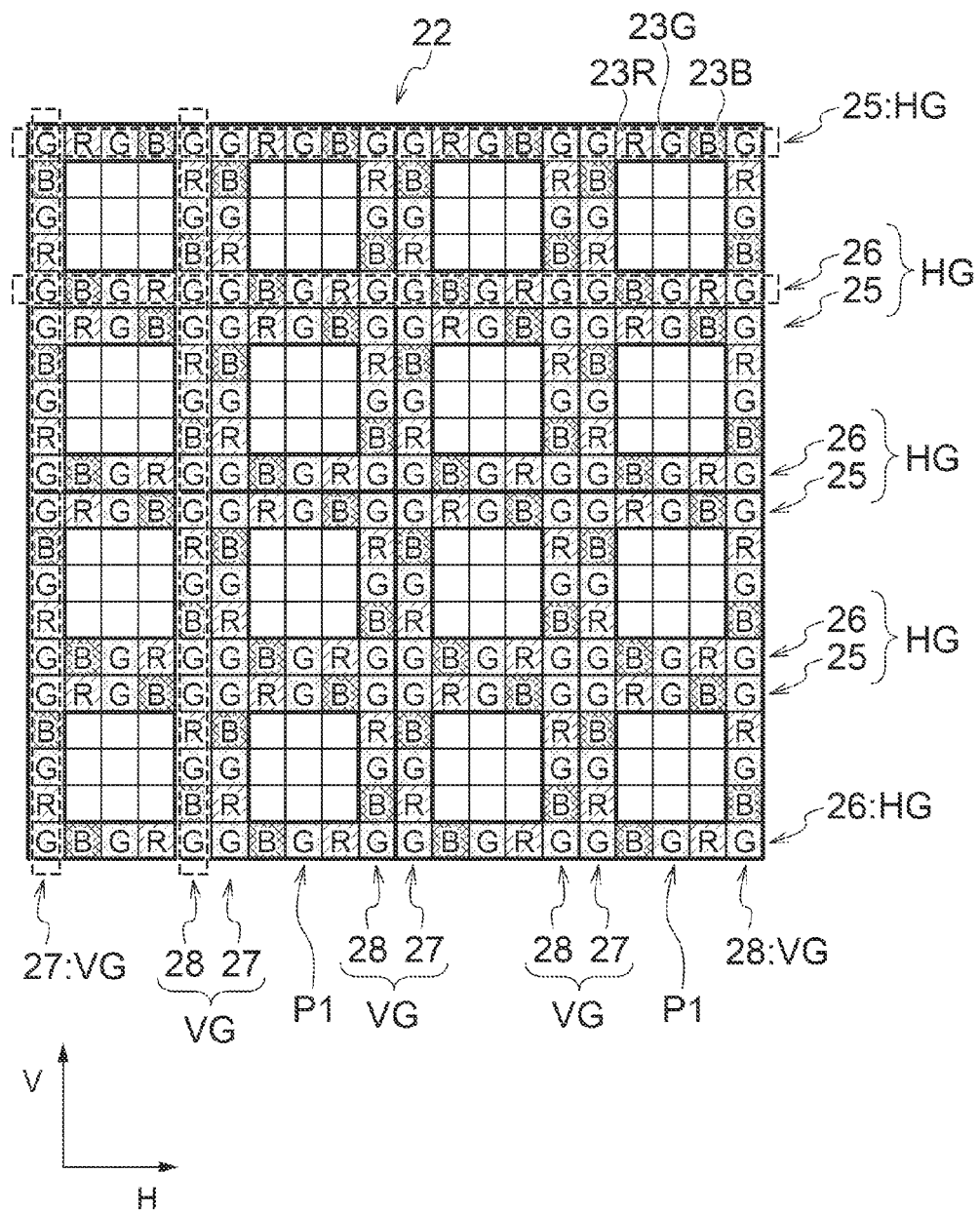
FIG. 6 is an explanatory drawing explaining a grating filter line in FIG. 3.

In addition, as illustrated in FIGS. 3, 4, and 6 (explanatory drawing of the grating filter line), the color filter array 22 of the present embodiment has the following feature (7).

[Feature (7)]

The color filter array 22 includes grating filter lines HG (25 and 26) in the first direction H, and grating filter lines VG (27 and 28) in the second direction V surrounding the four directions (upward direction, rightward direction, downward direction, and leftward direction in the Figure) of the square patterns QR and QB. The G filters (first filters) and the RB filters (second filters) are placed side by side in the grating filter lines HG in the first direction H and in the grating filter lines VG in the second direction V.

In addition, the grating filter lines HG and VG of the present embodiment have the following feature (7-1), feature (7-2), and feature (7-3).

[Feature (7-1)]

In the basic array pattern P1, the ratio of the grating filter lines HG in the first direction H and the grating filter lines VG in the second direction V is equal to the ratio of each of the R filters 23R and the B filters 23B. In other words, according to the present embodiment, each basic array pattern P1 includes therein the same number of R filters 23R and B filters 23B placed in the grating filter lines HG in the first direction H and the same number of R filters 23R and B filters 23B placed in the grating filter line VG in the second direction V.

[Feature (7-2)]

The G filters 23G (first filters) are placed one by one adjacent to each side of the four sides (upper side, right side, lower side, and left side in the Figure) of the square patterns QR and QB, and the R filters 23R and the B filters 23B (filters of each color of the second color filters) are placed one by one adjacent to each side of the four sides of the square patterns QR and QB. In short, according to the present embodiment, the G filters 23G, the R filters 23R, and the B filters 23B are placed one by one adjacent to each side of the four sides of the square patterns QR and QB.

[Feature (7-3)]

As illustrated in FIGS. 3 and 6, the grating filter line HG in the first direction H includes two 1-pixel wide filter lines 25 and 26, and the grating filter line VG in the second direction V includes two 1-pixel wide filter lines 27 and 28. In short, the grating filter line HG in the first direction H and the grating filter line VG in the second direction V which are orthogonal to each other are 2 pixels wide.

[Feature (7-4)]

As illustrated in FIGS. 3 and 6, the second filters (R filter 23R and B filter 23B) are arranged every second or third pixel in the grating filter line HG in the first direction H and in the grating filter line VG in the second direction V. The first filters (G filters) are arranged every second pixel or placed adjacent to each other.

Figure 7:
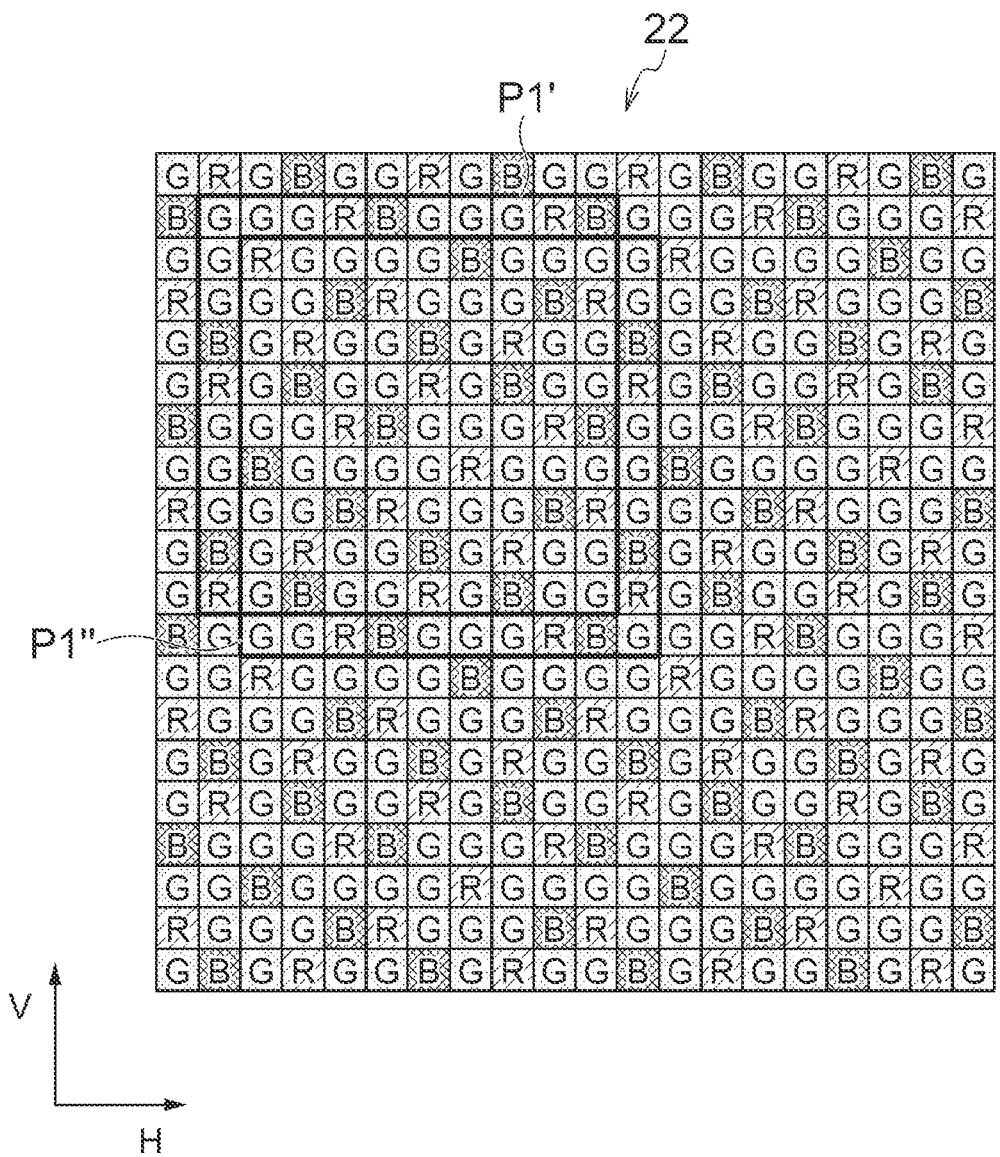
FIG. 7 is an explanatory drawing explaining a plurality of types of basic array patterns according to the first embodiment.

As illustrated in FIG. 7, assuming that a basic array pattern P1' is formed by shifting the basic array pattern P1 by one pixel in the horizontal direction and in the vertical direction and a basic array pattern P1" is formed by shifting the basic array pattern P1' by two pixels in the horizontal direction and in the vertical direction, the same color filter array 22 can be formed by repeatedly arranging the basic array patterns P1' and P1" in the horizontal direction and in the vertical direction. Thus, the color filter array 22 illustrated in FIG. 3 may include a plurality of basic array patterns. For the sake of convenience, the first embodiment uses the basic array pattern P1 illustrated in FIG. 4 as the basic array pattern.

As described above, the color filter array 22 of the present embodiment has the aforementioned features and thus can simplify demosaicing processing in a subsequent stage; can improve reproduction precision of the demosaicing processing in a high frequency region; can suppress aliasing and improve high frequency reproducibility at the demosaicing processing; can improve the precision of the demosaicing processing of the R pixels and the B pixels; can achieve high resolution; and can determine the highly correlated direction.

[Color Imaging Element of Second Embodiment]

Figure 8:
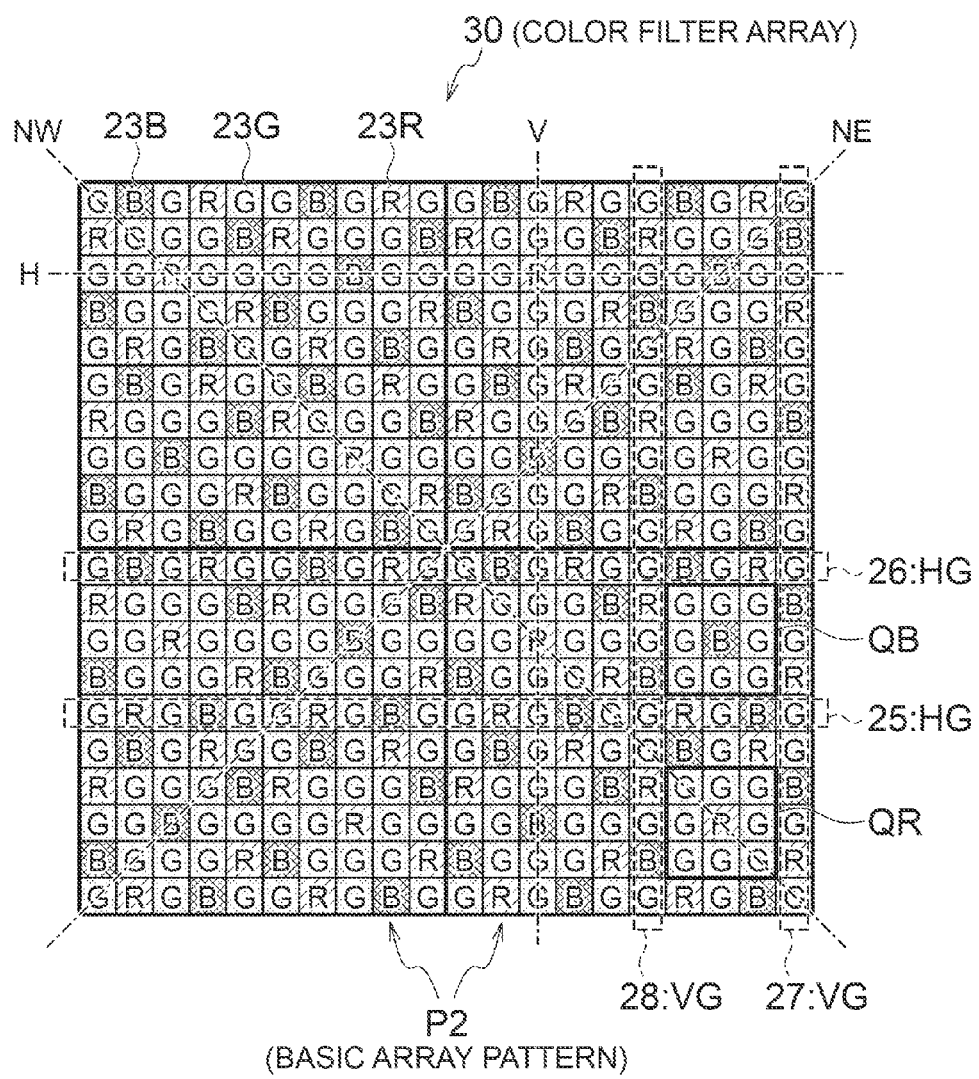
FIG. 8 is a front view of a color filter array according to a second embodiment.

As illustrated in FIG. 8, a color filter array 30 of the second embodiment is formed by repeatedly arranging a basic array pattern P2 different from the basic array pattern P1 in the first direction H and in the second direction V which are orthogonal to each other. The basic array pattern P2 is basically the same as the basic array pattern P1 of the first embodiment except for the arrangement of the grating filter lines HG (25 and 26) in the first direction H and the grating filter lines VG (27 and 28) in the second direction V (except that "25" is interchanged with "26" of the grating filter lines HG in the first direction H, and "27" is interchanged with "28" of the grating filter lines VG in the second direction V). In short, what is different is the order of arranging the R filters 23R and the B filters 23B in the grating filter lines HG and VG. Thus, the color filter array 30 of the second embodiment has the similar features to the color filter array 22 of the aforementioned first embodiment and can obtain the similar effects to the color filter array 22.

[Color Imaging Element of Third Embodiment]

Next, with reference to FIG. 9, a color imaging element of the third embodiment of the present invention will be described. Note that the color imaging element of the third embodiment has basically the same configuration as the configuration of the color imaging element of the aforementioned first embodiment except for a color filter array 32 having the following feature (7-3a) instead of the aforementioned feature (7-3) and having the following feature (7-4a) instead of the aforementioned feature (7-4). For this reason, the same reference numerals or characters are assigned to the same functions and configurations as the functions and the configurations of the above-described first embodiment, and description thereof is omitted.

[Color Filter Array of Third Embodiment]

The color filter array 32 includes a basic array pattern P3 having the RGB filters 23R, 23G, and 23B arranged in an array pattern corresponding to 8×8 pixels, and the basic array pattern P3 is repeatedly placed in the horizontal direction (H) and in the vertical direction (V). For this reason, the color filter array 32 has the above-described feature (1).

Figure 10:
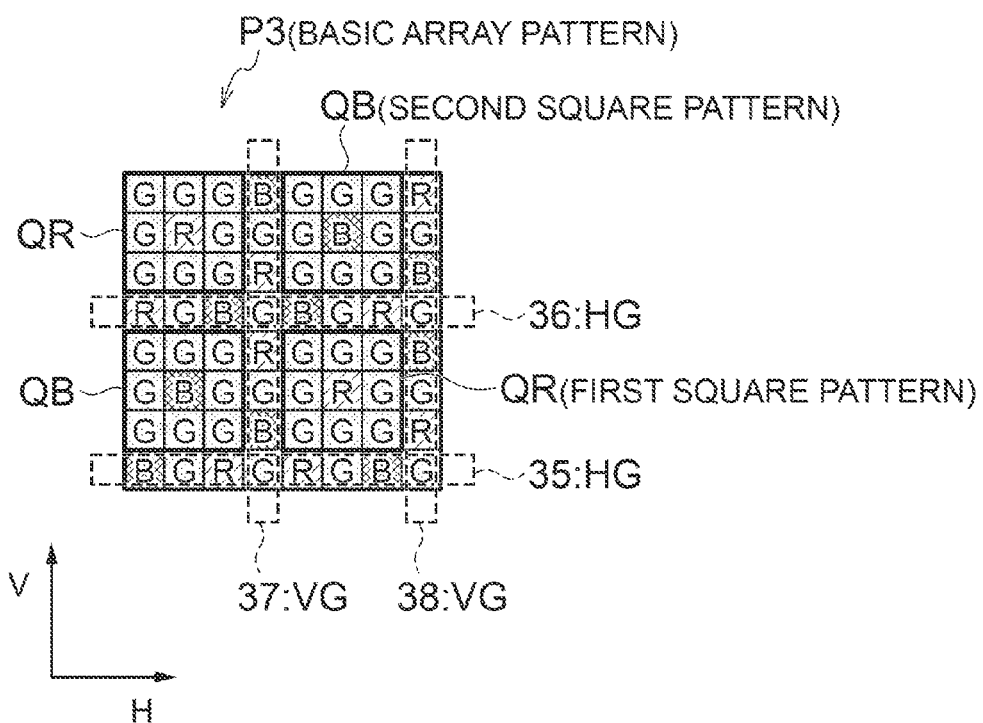
FIG. 10 is an enlarged view of a basic array pattern in FIG. 9.
Figure 11:
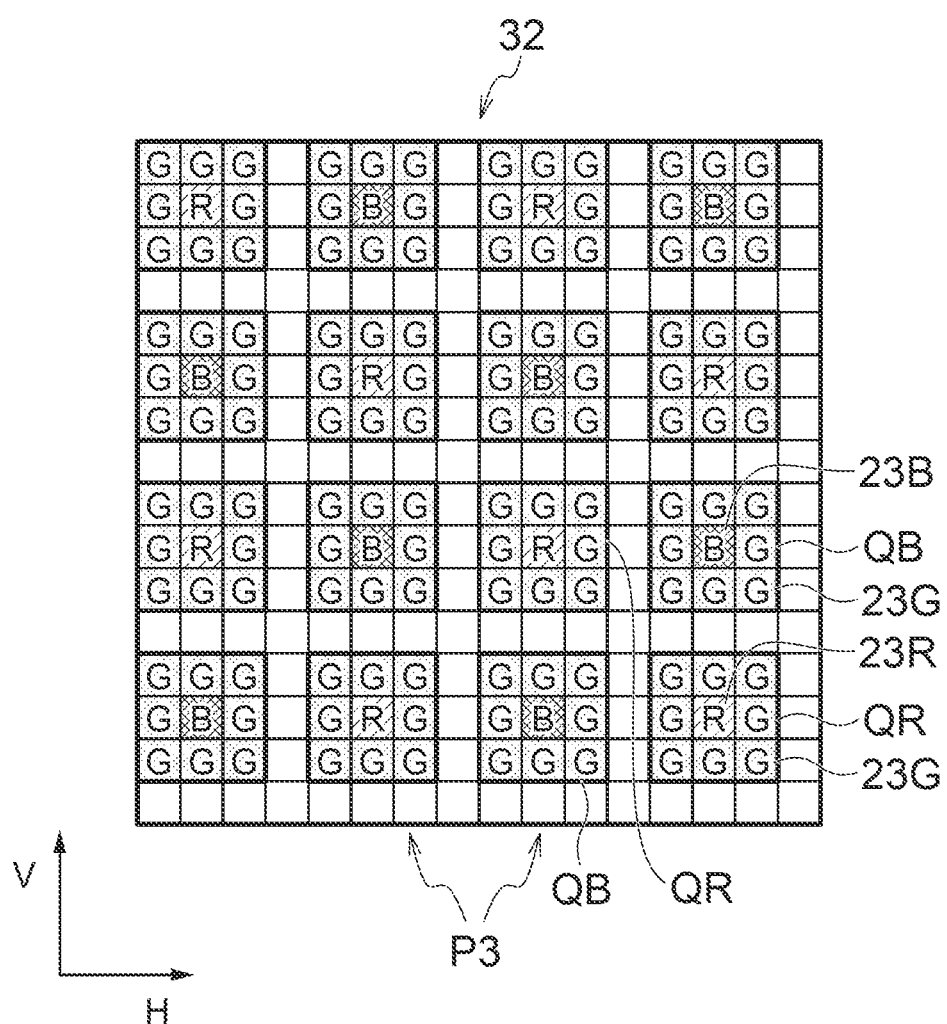
FIG. 11 is an explanatory drawing explaining a square pattern in FIG. 9.

In the color filter array 32, one or more G filters 23G are placed in each filter line in the first direction H, in the second direction V, in the third direction NE, and in the fourth direction NW. The numbers of pixels of the R pixels, the G pixels, and the B pixels corresponding to the RGB filters 23R, 23G, and 23B in the basic array pattern P3 are 10, 44, and 10 respectively. The ratio of the number of each pixel of the RGB pixels is 5:22:5. Further, each basic array pattern P3 includes therein one or more R filters 23R and B filters 23B placed in each filter line in the first direction H and in the second direction V of the color filter array 32. Furthermore, the same R filters 23R or the same B filters 23B are not placed adjacent to each other in each direction (H, V, NE, and NW). As illustrated in FIGS. 10 and 11 (explanatory drawing of the square pattern), the basic array pattern P3 includes four square patterns (QR and QB) corresponding to 3×3 pixels. Thus, the color filter array 32 has the above-described features (2) to (6). In addition, the square patterns (QR and QB) has the above-described features (6-1) and (6-2).

Figure 9:
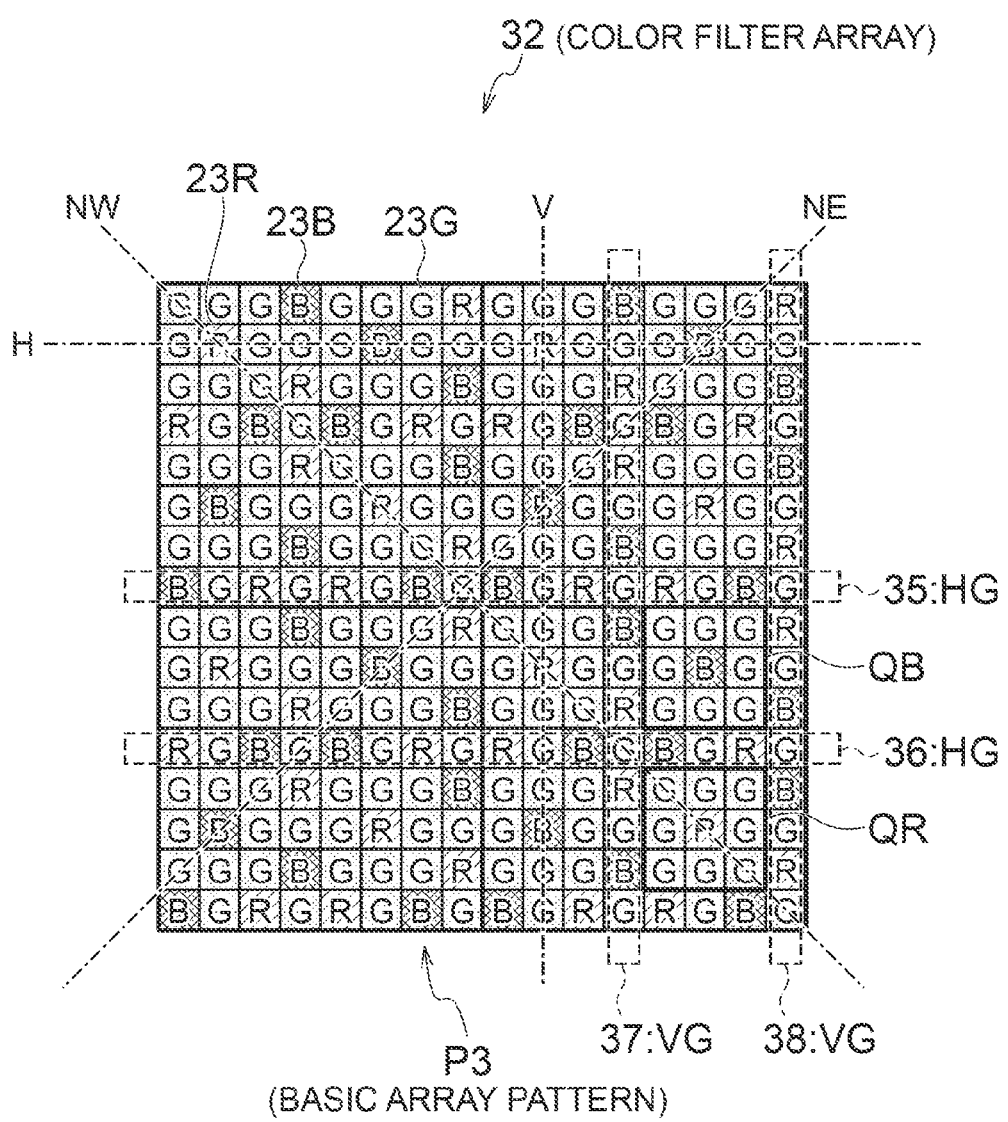
FIG. 9 is a front view of a color filter array according to a third embodiment.
Figure 12:
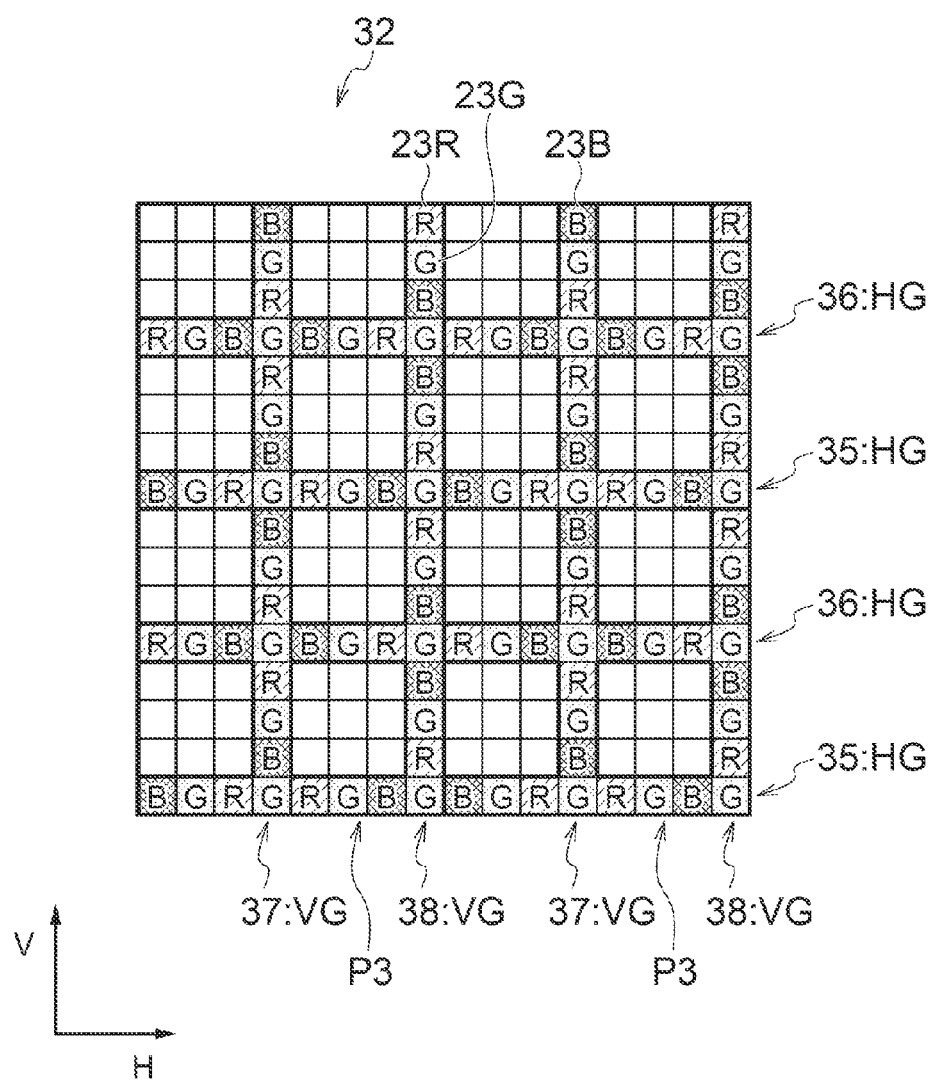
FIG. 12 is an explanatory drawing explaining a grating filter line in FIG. 9.

As illustrated in FIGS. 9 and 12 (explanatory drawing of the grating filter line), the color filter array 32 includes grating filter lines HG (35 and 36) in the first direction H and grating filter lines VG (37 and 38) in the second direction V, each surrounding the four directions (upward direction, rightward direction, downward direction, and leftward direction in the Figure) of each of the square patterns QR and QB. The G filters (first filters) and the RB filters (second filters) are placed side by side in the grating filter lines HG in the first direction H and in the grating filter lines VG in the second direction V. In addition, as illustrated in FIG. 10, the basic array pattern P3 includes therein the same number (two for each) of R filters 23R and B filters 23B in the grating filter lines HG (35 and 36) in the first direction H, and the same number (two for each) of R filters 23R and B filters 23B in the grating filter lines VG in the second direction V. In addition, the G filters 23G (first filter), the R filters 23R, and the B filters 23B are placed one by one adjacent to each side of the four sides of the square patterns QR and QB. Thus, like the color filter array 22 of the first embodiment, the color filter array 32 of the present embodiment has the feature (7), the feature (7-1), and the feature (7-2) as follows.

In addition, the grating filter lines HG and VG in the color filter array 32 of the present embodiment have the feature (7-3a) and the feature (7-4a) as follows.

[Feature (7-3a)]

As illustrated in FIGS. 9 and 12, the grating filter line HG in the first direction H includes two 1-pixel wide filter lines 35 and 36 which are alternately arranged with the square patterns QB and QR interposed therebetween; and the grating filter line VG in the second direction V includes two 1-pixel wide filter lines 37 and 38 which are alternately arranged with the square patterns QB and QR interposed therebetween. Specifically, each of the grating filter line HG in the first direction H and the grating filter line VG in the second direction V which are orthogonal to each other is 1 pixel wide.

[Feature (7-4a)]

As illustrated in FIGS. 9 and 12, the first filters (G filters 23G) are arranged every second pixel in the grating filter line HG in the first direction H and in the grating filter line VG in the second direction V. In addition, the second filters (R filter 23R and B filter 23B) are arranged every second pixel in the grating filter lines HG and VG.

Figure 13:
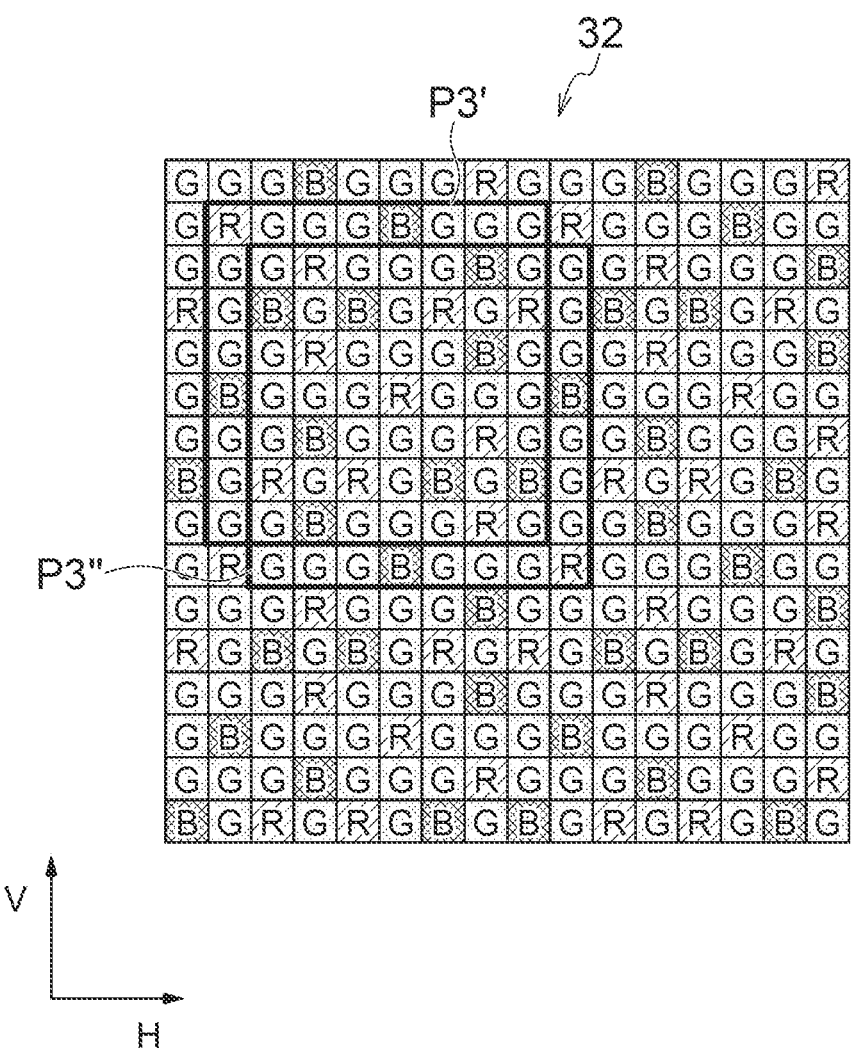
FIG. 13 is an explanatory drawing explaining a plurality of types of basic array patterns according to the third embodiment.

As illustrated in FIG. 13, assuming that a basic array pattern P3' is formed by shifting the basic array pattern P3 by one pixel in the horizontal direction and in the vertical direction and a basic array pattern P3" is formed by shifting the basic array pattern P3' by two pixels in the horizontal direction and in the vertical direction, the same color filter array 22 can be formed by repeatedly arranging the basic array patterns P3' and P3" in the horizontal direction and in the vertical direction. Thus, the color filter array 22 illustrated in FIG. 9 may include a plurality of basic array patterns. For the sake of convenience, the third embodiment uses the basic array pattern P3 illustrated in FIG. 10 as the basic array pattern.

As described above, the color filter array 32 of the present embodiment has the aforementioned features and thus can simplify demosaicing processing in a subsequent stage; can improve reproduction precision of the demosaicing processing in a high frequency region; can suppress aliasing and improve high frequency reproducibility at the demosaicing processing; can improve the precision of the demosaicing processing of the R pixels; can achieve high resolution; and can determine the highly correlated direction.

[Color Imaging Element of Fourth Embodiment]

Figure 14:
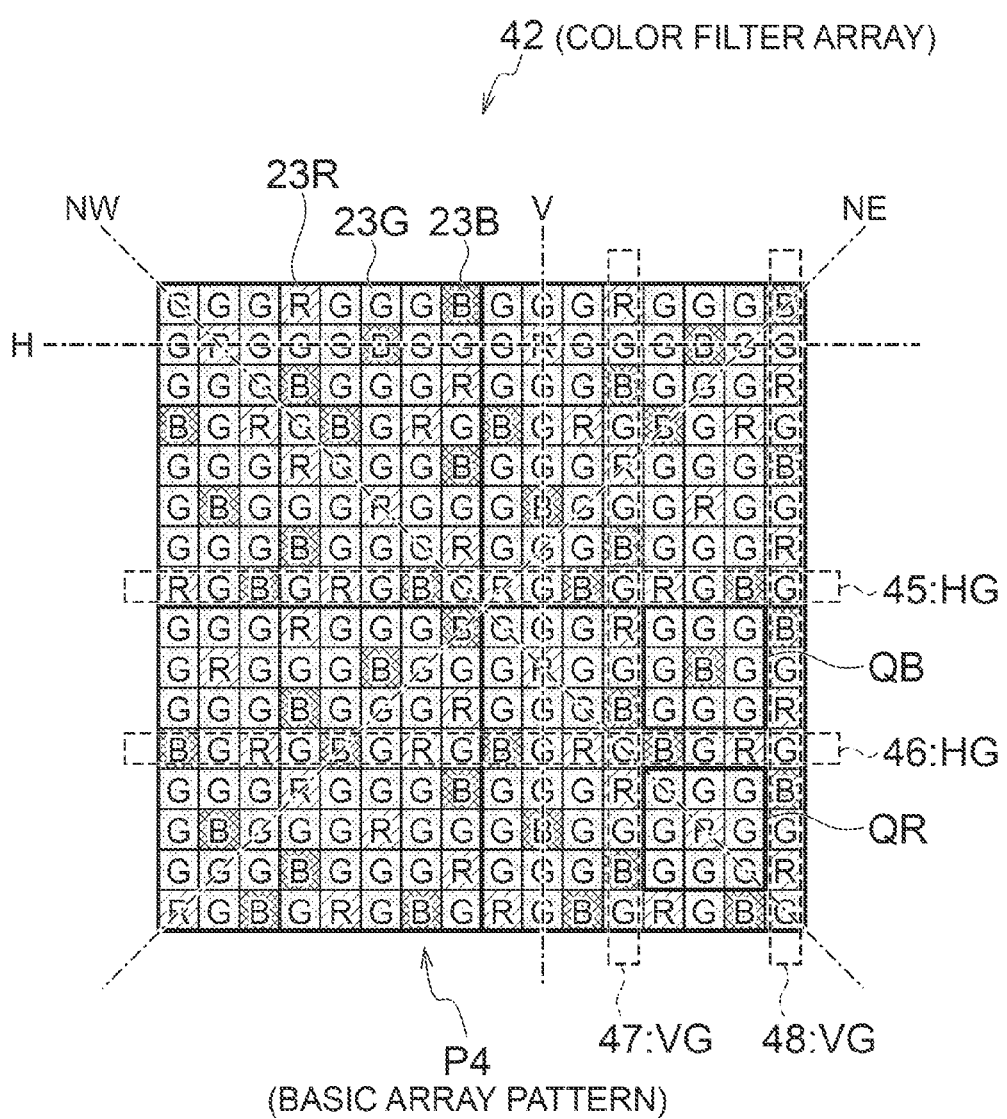
FIG. 14 is a front view of a color filter array according to a fourth embodiment.

As illustrated in FIG. 14, a color filter array 42 of the fourth embodiment is formed by repeatedly arranging a basic array pattern P4 different from the basic array pattern P3 in the first direction H and in the second direction V which are orthogonal to each other.

The basic array pattern P4 of the present embodiment is basically the same as the basic array pattern P3 of the third embodiment except for the order in which the R filters 23R and the B filters 23B are placed in the grating filter lines HG and VG. Thus, the color filter array 42 of the fourth embodiment has the similar features to the color filter array 32 of the aforementioned third embodiment and can obtain the similar effects to the color filter array 32.

More specifically, according to the third embodiment, as illustrated in FIG. 9, filters are placed in the order of " . . . B, G, R, G, R, G, B, G, . . . " in any of the grating filter lines HG (35 and 36) and VG (37 and 38). In contrast to this, according to the fourth embodiment, as illustrated in FIG. 14, filters are placed in the order of " . . . R, G, B, G, R, G, B, G, . . . " in any of the grating filter lines HG (45 and 46) and VG (47 and 48).

[Color Imaging Element of Fifth Embodiment]

Figure 15:
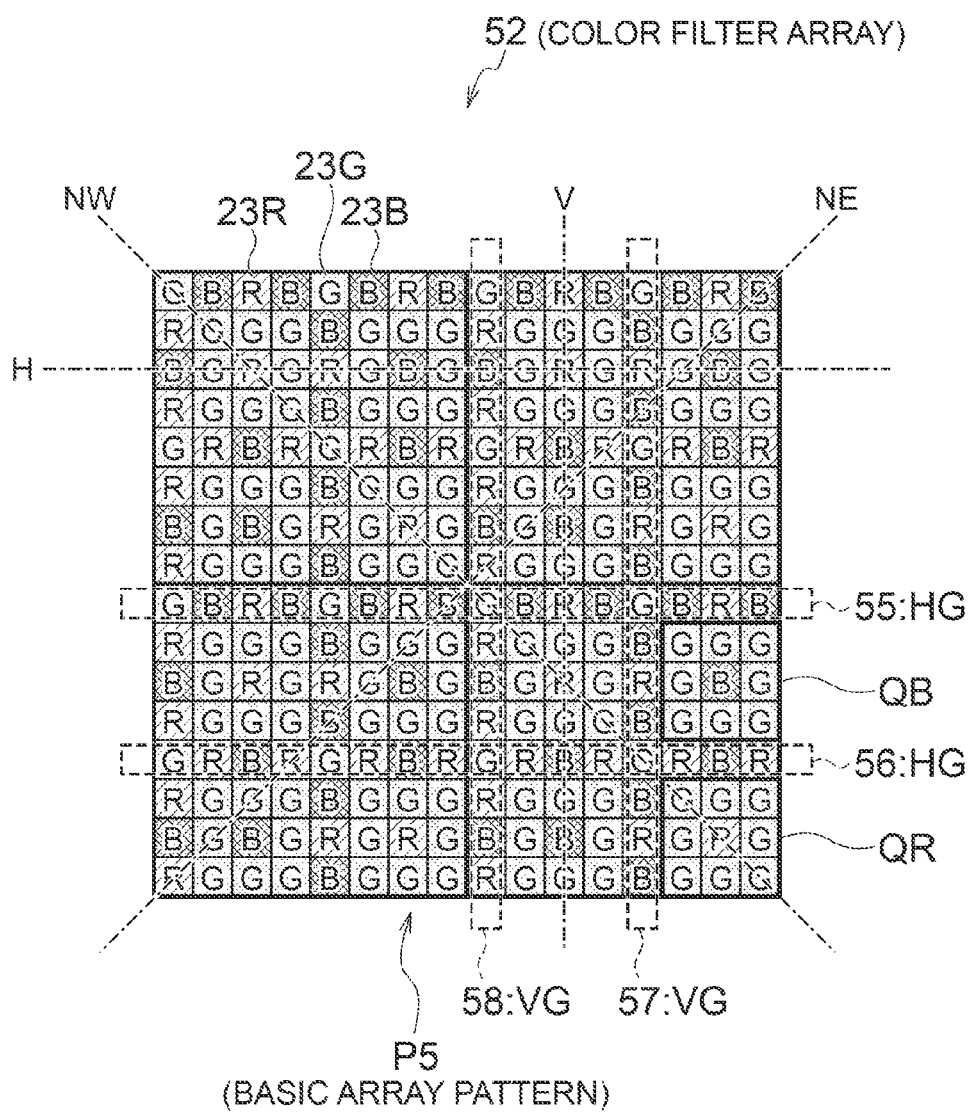
FIG. 15 is a front view of a color filter array according to a fifth embodiment.

Next, with reference to FIG. 15, a color imaging element of the fifth embodiment of the present invention will be described. Note that the color filter array 52 of the fifth embodiment is basically the same as the basic array pattern P3 of the third embodiment except for the order in which the filters 23R, 23G, and 23B are placed in the grating filter lines HG and VG. For this reason, the same reference numerals or characters are assigned to the same functions and configurations as the functions and the configurations of the above-described third embodiment, and description thereof is omitted.

The color filter array 52 of the present embodiment has a higher abundance ratio of RB filters (second color filters) in the grating filter lines HG and VG than the color filter array of the third embodiment (32 in FIG. 9) and the color filter array of the fourth embodiment (42 in FIG. 14).

Figure 16:
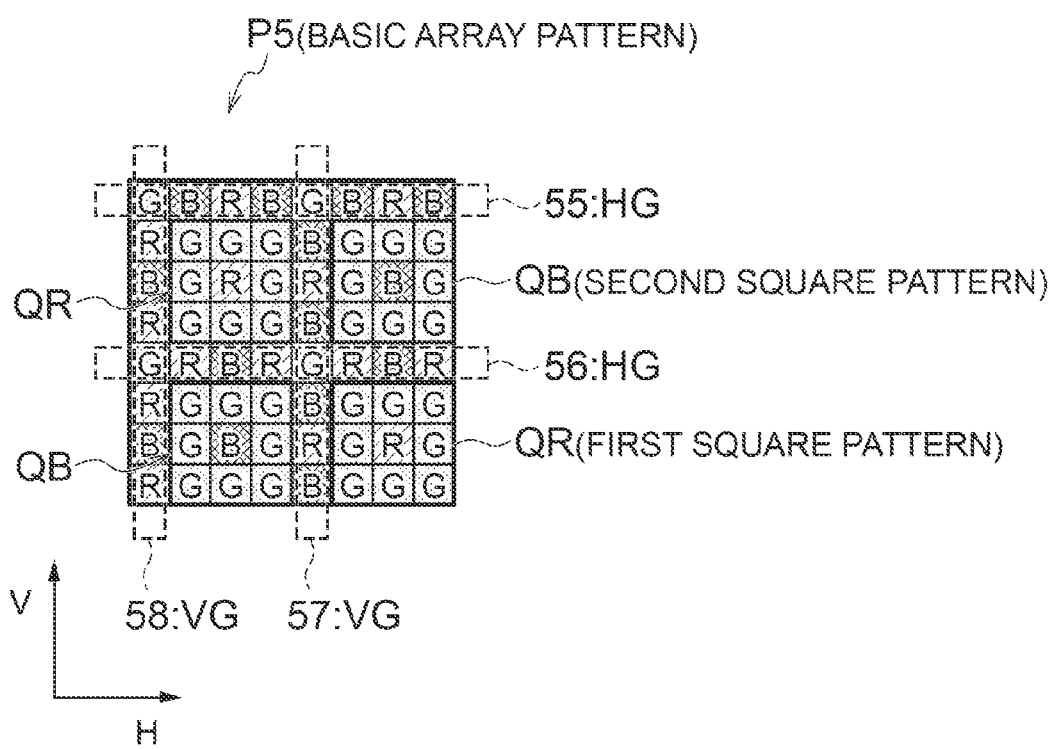
FIG. 16 is an enlarged view of a basic array pattern in FIG. 15.

FIG. 16 illustrates a basic array pattern P5 in the color filter array 52 of the present embodiment. In FIG. 16, the grating filter line HG in the first direction H includes a filter line 55 having RB filters arranged in the order of "B, R, B" adjacent to a side of each of the square patterns QB and QR; and a filter line 56 having RB filters arranged in the order of "R, B, R" adjacent to a side of each of the square patterns QB and QR. In addition, the grating filter line VG in the second direction V includes a filter line 57 having RB filters arranged in the order of "B, R, B" adjacent to a side of each of the square patterns QB and QR; and a filter line 58 having RB filters arranged in the order of "R, B, R" adjacent to a side of each of the square patterns QB and QR.

The numbers of pixels of the R pixels, the G pixels, and the B pixels corresponding to the RGB filters 23R, 23G, and 23B in the basic array pattern P5 are 14, 36, and 14 respectively. The ratio of the number of each pixel of the RGB pixels is 7:18:7. Specifically, the abundance ratio of the R pixels and the B pixels is high in comparison with the ratio (5:22:5) of the number of each pixel of the RGB pixels in the basic array pattern P3 of the third embodiment, which improves color reproducibility. In particular, the ratio of the number of each pixel of the RGB pixels in the grating filter lines HG and VG of the present embodiment is 3:1:3. Thus, the abundance ratio of the R pixels and the B pixels is more than four times higher than the ratio (8:11:8) of the number of each pixel of the RGB pixels in the grating filter lines HG and VG of the third embodiment.

In addition, one or more G filters 23G are placed in each filter line in the horizontal direction (H), in the vertical direction (V), and diagonal directions (NE and NW) of the color filter array 52.

The color filter array 52 of the present embodiment has the above-described features (1) to (4) and features (6) to (7).

[Color Imaging Element of Sixth Embodiment]

Figure 17:
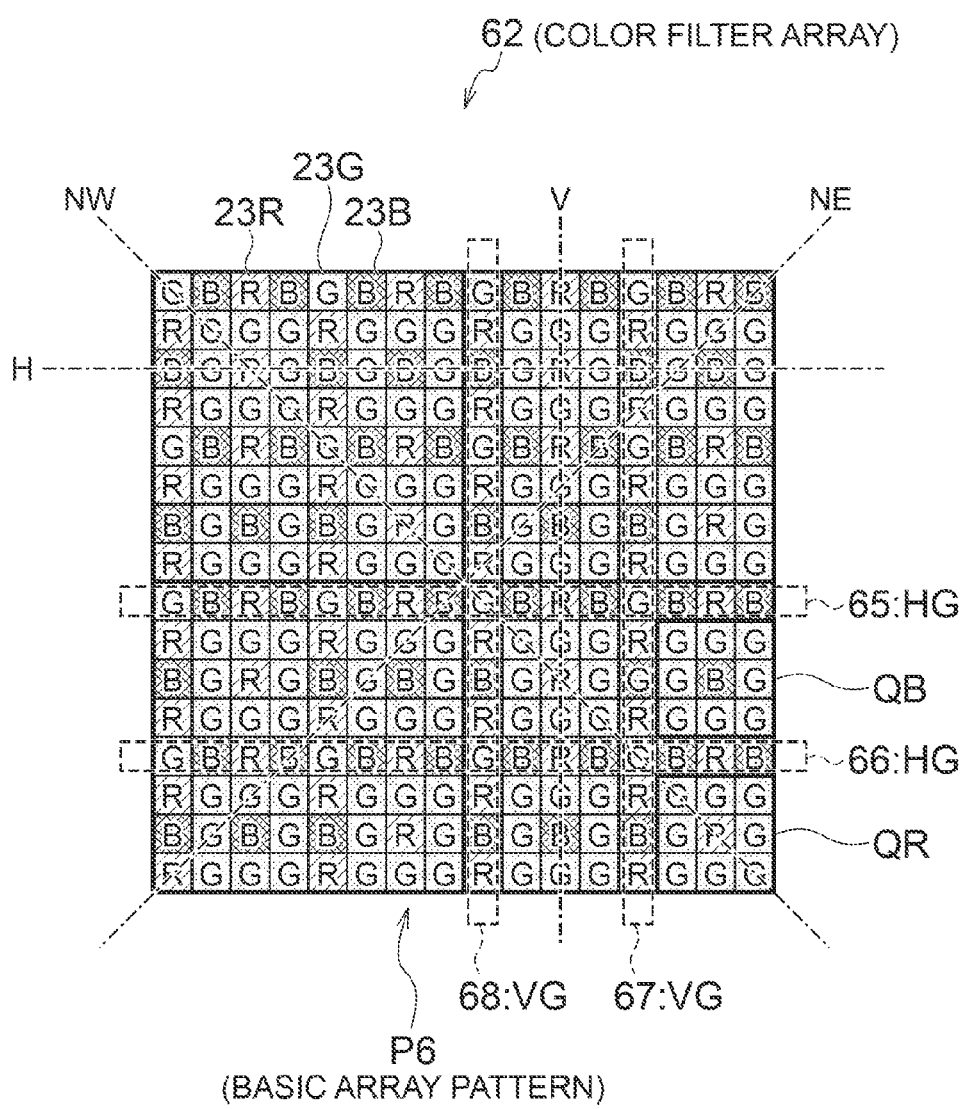
FIG. 17 is a front view of a color filter array according to a sixth embodiment.

Next, with reference to FIG. 17, a color imaging element of the sixth embodiment of the present invention will be described. Note that the color filter array 62 of the sixth embodiment is basically the same as the basic array pattern P3 of the third embodiment except for the order in which the filters 23R, 23G, and 23B are placed in the grating filter lines HG and VG. For this reason, the same reference numerals or characters are assigned to the same functions and configurations as the functions and the configurations of the above-described third embodiment, and description thereof is omitted.

The color filter array 62 of the present embodiment has a higher abundance ratio of RB filters (second color filters) in the grating filter lines HG and VG than the color filter array of the third embodiment (32 in FIG. 9) and the color filter array of the fourth embodiment (42 in FIG. 14).

Figure 18:
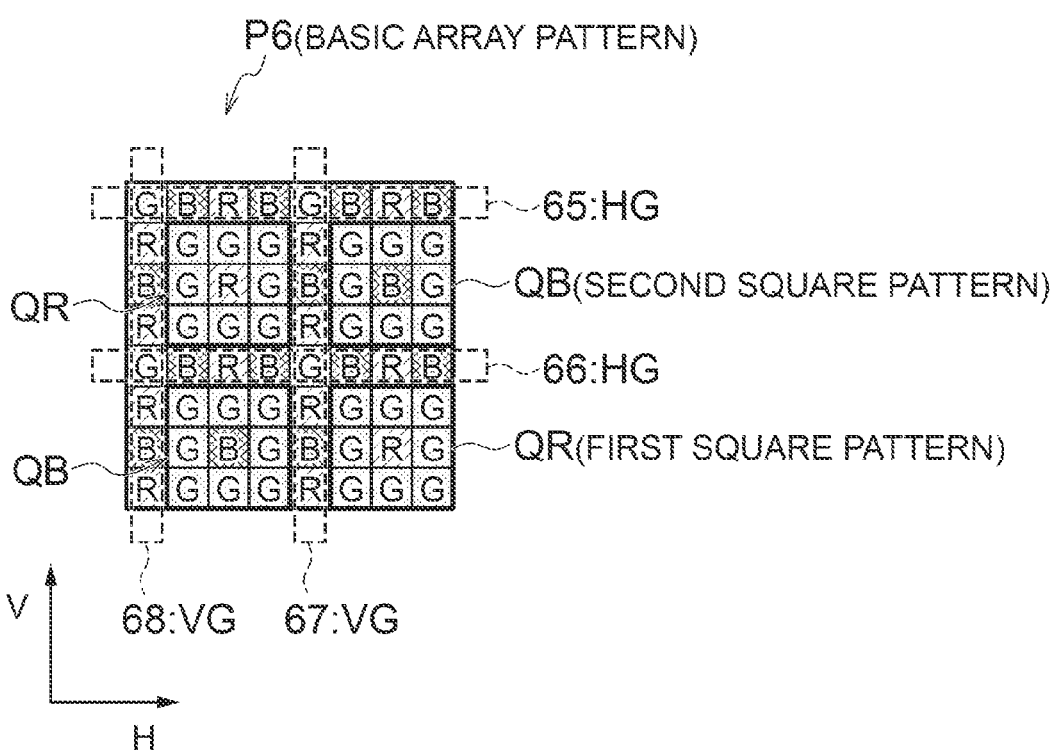
FIG. 18 is an enlarged view of a basic array pattern in FIG. 17.

FIG. 18 illustrates a basic array pattern P6 in the color filter array 62 of the present embodiment. In FIG. 18, the grating filter line HG in the first direction H includes a filter line 65 and a filter line 66 having RB filters arranged in the order of "B, R, B" adjacent to a side of each of the square patterns QB and QR. In addition, the grating filter line VG in the second direction V includes a filter line 67 and a filter line 68 having RB filters arranged in the order of "R, B, R" adjacent to a side of each of the square patterns QB and QR.

The number of pixels of each of the R pixels, the G pixels, and the B pixels corresponding to each of the RGB filters 23R, 23G, and 23B respectively in the basic array pattern P6 and the ratio of the number of each pixel of the RGB pixels are the same as those of the fifth embodiment. Thus, the abundance ratio of the R pixels and the B pixels is high in comparison with the ratio of the number of each pixel of the RGB pixels in the basic array pattern P3 of the third embodiment.

The color filter array 62 of the present embodiment has the above-described features (1) to (3) and features (5) to (7).

<Conditions of First Filter (First Color)>

The description of the above each embodiment has focused on the G filter 23G for the G color as an example of the first filter having the first color of the present invention, but instead of the G filters 23G or instead of some of the G filters 23G, a filter satisfying any of the following conditions (1) to (4) may be used.

[Condition (1)]

The condition (1) is that the contribution ratio for acquiring the brightness signal is 50% or higher. The contribution ratio of 50% is a value determined to distinguish between the first color (such as the G color) and the second color (such as the R color and the B color) of the present invention, and a value determined so that the "first color" includes a color whose contribution ratio for acquiring the brightness data is relatively higher than the contribution ratio of the R color, the B color, and the like. As shown in the above expression (1), the contribution ratio of the G color is 60%, which satisfies the condition (1). Note that the contribution ratio of a color other than the G color can also be acquired by experiments or simulations. Thus, a filter having a color, other than the G color, whose contribution ratio is 50% or higher can also be used as the first filter of the present invention. Note that a color whose contribution ratio is less than 50% serves as the second color (such as the R color and the B color) of the present invention and a filter having the color serves as the second filter of the present invention.

[Condition (2)]

The condition (2) is that the peak transmittance of the filter is in a range from a wavelength of 480 nm or more to 570 nm or less. For example, a value measured by a spectrophotometer is used for the transmittance of the filter. This wavelength range is also a range determined to distinguish between the first color (such as the G color) and the second color (such as the R color and the B color) of the present invention, and is a range determined not to include a peak of each of the R color and the B color each of whose contribution ratio described above is relatively low and to include a peak of the G color whose contribution ratio is relatively high. Thus, a filter whose peak transmittance is in a range from a wavelength of 480 nm or more to 570 nm or less can be used as the first filter. Note that a filter whose peak transmittance is outside a range from a wavelength of 480 nm or more to 570 nm or less serves as the second filter (the R filter 23R and the B filter 23B) of the present invention.

[Condition (3)]

The condition (3) is that the transmittance in a range from a wavelength of 500 nm or more to 560 nm or less is higher than the transmittance of the second filter (the R filter 23R and the B filter 23B). Also in the condition (3), for example, a value measured by a spectrophotometer is used for the transmittance of the filter. The wavelength range of the condition (3) is also a range determined to distinguish between the first color (such as the G color) and the second color (such as the R color and the B color) of the present invention, and is a range where the transmittance of a filter having a color whose contribution ratio described above is relatively higher than the contribution ratio of the R color and the B color is higher than the transmittance of each of the RB filters 23R and 23B. Thus, a filter whose transmittance is relatively high in a range from a wavelength of 500 nm or more to 560 nm or less can be used as the first filter, and a filter whose transmittance is relatively low can be used as the second filter.

[Condition (4)]

The condition (4) is that a filter having two or more colors including a color (such as the G color of the RGB) contributing most to the brightness signal among the three primary colors and a color different from the three primary colors is used as the first filter. In this case, a filter corresponding to a color other than each color of the first filter serves as the second filter.

[Color Imaging Element of Seventh Embodiment]

Next, with reference to FIG. 19, a color imaging element of the seventh embodiment of the present invention will be described. Note that the color imaging element of the seventh embodiment has basically the same configuration as the configuration of the color imaging element of the aforementioned first embodiment except for having a white pixel (also called a clear pixel) receiving white light (light in a visible light wavelength range) other than the RGB pixels. For this reason, the same reference numerals or characters are assigned to the same functions and configurations as the functions and the configurations of the above-described first embodiment, and description thereof is omitted.

[Color Filter Array of Seventh Embodiment]

The color imaging element of the seventh embodiment has a color filter array 63 different from the color filter array of the first embodiment. The color filter array 63 includes a basic array pattern P7 having the aforementioned RGB filters 23R, 23G, and 23B and transparent filter 23W (first filter) arranged in an array pattern corresponding to 8×8 pixels, and the basic array pattern P7 is repeatedly placed in the horizontal and vertical directions (H and V). For this reason, the color filter array 63 has the above-described feature (1).

The basic array pattern P7 has an array pattern formed by replacing some of the G filters 23G in the basic array pattern P1 with transparent filters 23W. For example, the G filter 23G adjacent to another G filter 23G in the horizontal and vertical directions (H and V) is replaced with a transparent filter 23W. Thus, according to the color imaging element of the seventh embodiment, some of the G pixels are replaced with white pixels. Consequently, even if pixel size is miniaturized, deterioration of color reproducibility can be suppressed.

The transparent filter 23W is a filter having a transparent color (first color). The transparent filter 23W can transmit light corresponding to a visible light wavelength range and, for example, serves as a filter where the transmittance of light of each color of the RGB is 50% or higher. The transmittance of the transparent filter 23W is higher than the transmittance of the G filter 23G, and thus the contribution ratio for acquiring the brightness signal is higher than the contribution ratio of the G color (60%), which satisfies the aforementioned condition (1).

Figure 20:
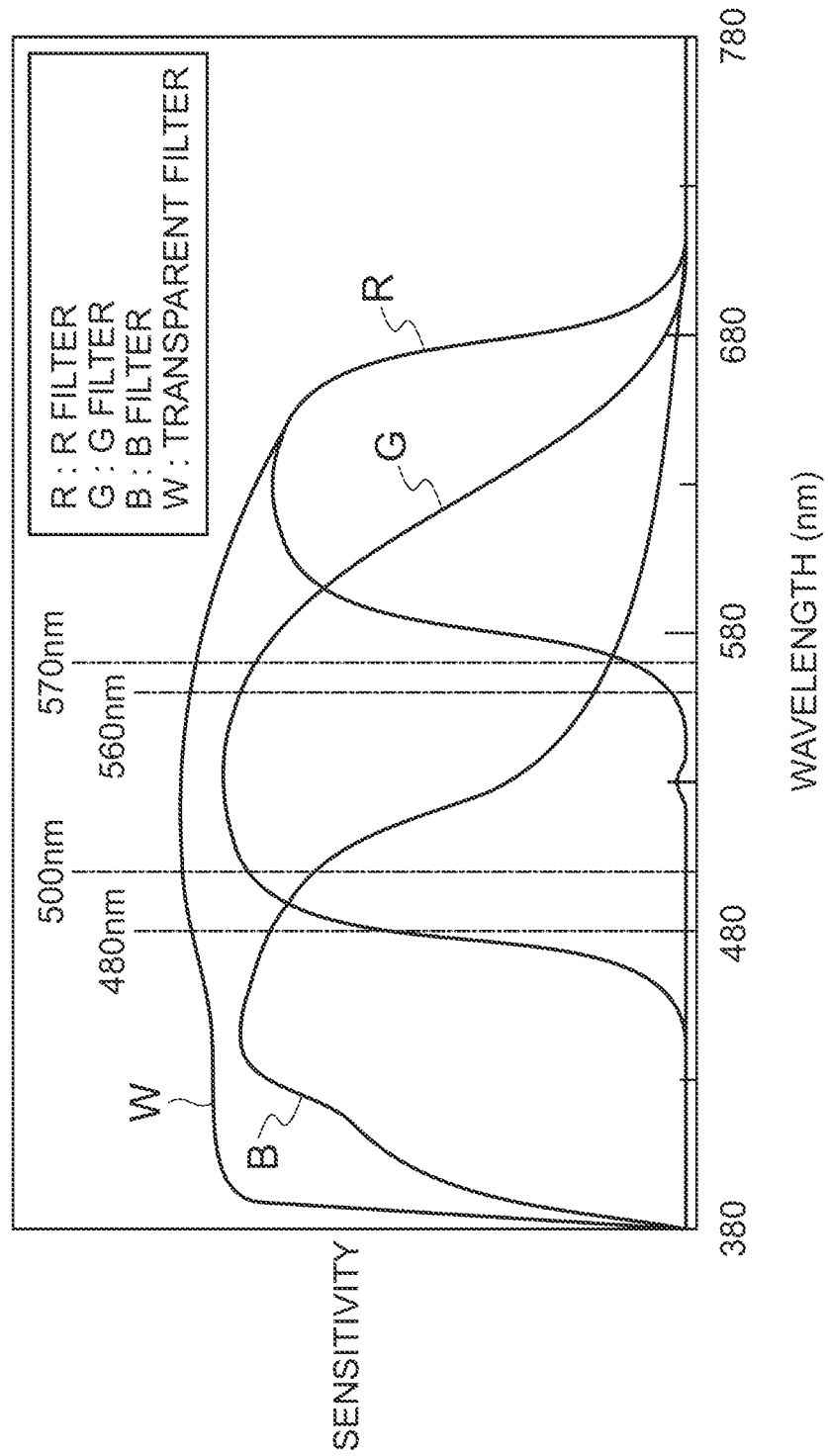
FIG. 20 is a graph illustrating spectral sensitivity characteristics of the color filter array according to the seventh embodiment.

In FIG. 20 illustrating spectral sensitivity characteristics of the color filter array 63, the peak transmittance of the transparent filter 23W (peak sensitivity of the white pixel) is in a range from a wavelength of 480 nm or more to 570 nm or less. In addition, the transmittance of the transparent filter 23W is in a range from a wavelength of 500 nm or more to 560 nm or less, which is higher than the transmittance of each of the RB filters 23R and 23B. Thus, the transparent filter 23W also satisfies the aforementioned conditions (2) and (3). Note that the G filter 23G also satisfies the aforementioned conditions (1) to (3) like the transparent filter 23W.

As described above, the transparent filter 23W satisfies the aforementioned conditions (1) to (3), and thus can be used as the first filter of the present invention. Note that the color filter array 36 replaces some of the G filters 23G corresponding to the G color contributing most to the brightness signal among the three primary colors of RGB with transparent filters 23W and thus also satisfies the aforementioned condition (4).

Figure 19:
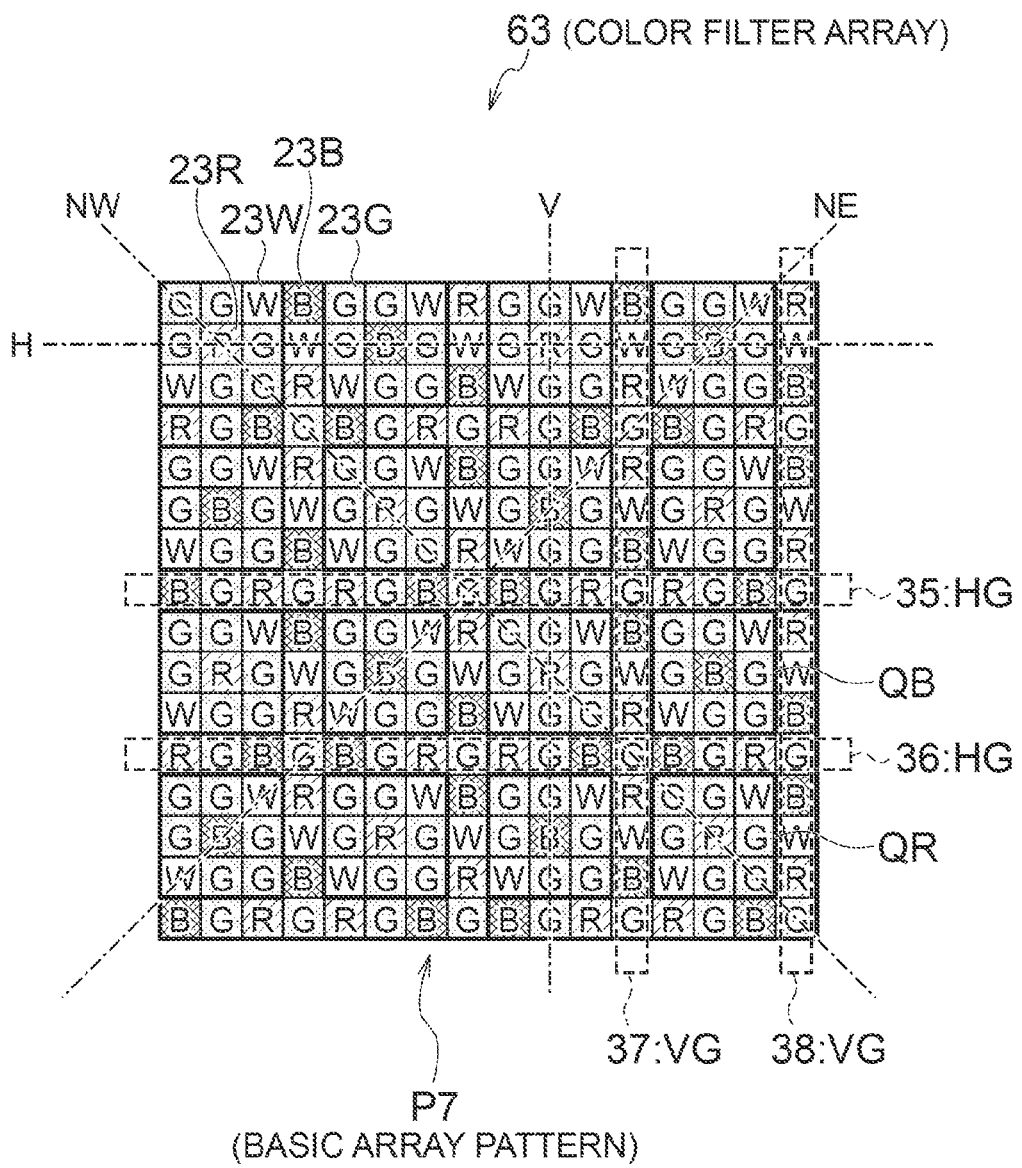
FIG. 19 is a front view of a color filter array according to a seventh embodiment.

Referring now back to FIG. 19, as described above, the color filter array 63 is basically the same as the color filter array 22 of the first embodiment except for replacing some of the G filters 23G with transparent filters 23W, and thus has the similar features (2) to (6) to the color filter array 22 of the first embodiment. Thus, the color filter array 63 can obtain the similar effects to the effects described in the first embodiment.

Note that the arrangement and the number of transparent filters 23W are not limited to those of the embodiment illustrated in FIG. 19, but may be appropriately changed. In this case, if one or more first filters including a G filter 23G and a transparent filter 23W are included in the filter line in each direction of the horizontal direction, the vertical direction, and the diagonal directions (NE and NW) of the color filter array 63, the first filters satisfy the aforementioned feature (2).

[Color Imaging Element of Eighth Embodiment]

Next, with reference to FIG. 21, a color imaging element of the eighth embodiment of the present invention will be described. Note that the color imaging element of the eighth embodiment has basically the same configuration as the configuration of the color imaging element of the aforementioned first embodiment except for having two types of G pixels. For this reason, the same reference numerals or characters are assigned to the same functions and configurations as the functions and the configurations of the above-described first embodiment, and description thereof is omitted.

[Color Filter Array of Eighth Embodiment]

The color imaging element of the eighth embodiment has a color filter array 64 different from the color filter array of the first embodiment. The color filter array 64 includes a basic array pattern P8 having R filters 23R, first G filters 23G1 and second G filters 23G2 (first filters), and B filters 23B arranged in an array pattern corresponding to 8×8 pixels, and the basic array pattern P8 is repeatedly placed in the horizontal and vertical directions (H and V). For this reason, the color filter array 64 has the above-described feature (1).

The basic array pattern P8 has an array pattern formed by replacing each G filter 23G in the basic array pattern P1 of the first embodiment with a first G filter 23G1 or a second G filter 23G2. For example, in the present embodiment, the first G filters 23G1 and the second G filters 23G2 are placed in even-numbered filter rows in the horizontal direction so as to prevent the first G filters 23G1 from being adjacent to each other, so as to prevent the second G filters 23G2 from being adjacent to each other, and so as to allow the same number of first G filters 23G1 and second G filters 23G2 to be placed in the basic array pattern P8.

Figure 22:
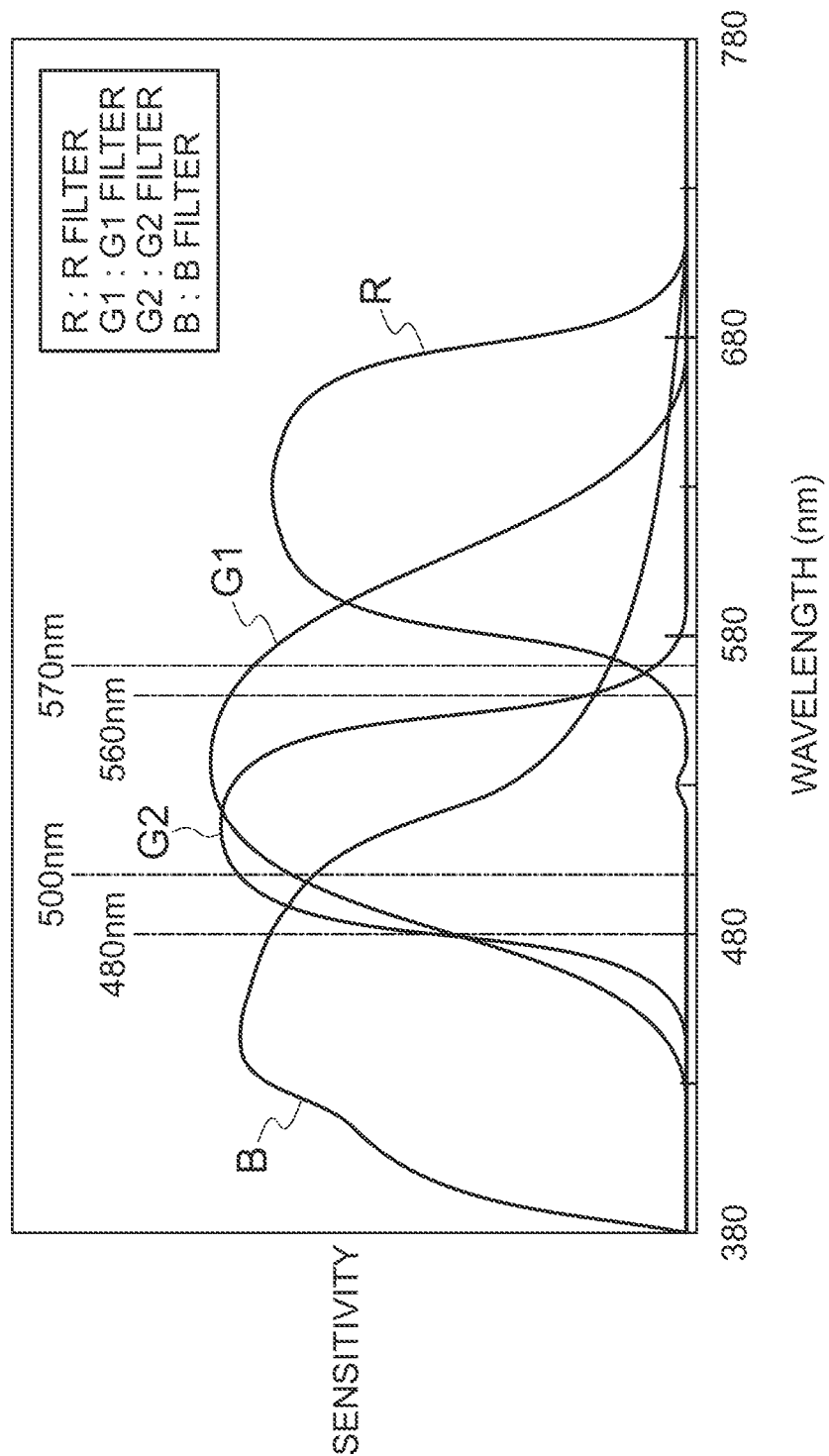
FIG. 22 is a graph illustrating spectral sensitivity characteristics of the color filter array according to the eighth embodiment.

The first G filter 23G1 transmits G light of a first wavelength band, and the second G filter 23G2 transmits G light of a second wavelength band having a high correlation with the first G filter 23G1 (see FIG. 22). An existing G filter (such as the G filter 23G of the first embodiment) can be used as the first G filter 23G1. In addition, a filter having a high correlation with the first G filter 23G1 can be used as the second G filter 23G2. In this case, it is preferable that the peak value of a spectral sensitivity curve of the second G filter 23G2 is in a range, for example, from a wavelength of 500 nm to 535 nm (near the peak value of a spectral sensitivity curve of the existing G filter). Note that for example, a method disclosed in Japanese Patent Application Laid-Open No. 2003-284084 is used as the method of determining the color filter having four colors.

As described above, the color imaging element of the eighth embodiment uses four types of colors of an image acquired thereby, which increases the amount of acquired color information. Thus, the present embodiment can more accurately reproduce colors than other embodiments acquiring only three types of colors (RGB). More specifically, colors seen different in the eyes can be reproduced as different colors, and colors seen identical in the eyes can be reproduced as identical colors, which can improve "color discrimination".

The transmittance of each of the first and second G filters 23G1 and 23G2 is basically the same as the transmittance of the G filter 23G of the first embodiment, and thus the contribution ratio for acquiring the brightness signal is higher than 50%. Accordingly, the first and second G filters 23G1 and 23G2 satisfy the aforementioned condition (1).

In addition, in FIG. 22 illustrating the spectral sensitivity characteristics of the color filter array 64, the peak transmittance of each of the G filters 23G1 and 23G2 (peak sensitivity of each G pixel) is in a range from a wavelength of 480 nm or more to 570 nm or less. The transmittance of each of the G filters 23G1 and 23G2 is in a range from a wavelength of 500 nm or more to 560 nm or less, which is higher than the transmittance of each of the RB filters 23R and 23B. For this reason, each of the G filters 23G1 and 23G2 also satisfies the aforementioned conditions (2) and (3).

Figure 21:
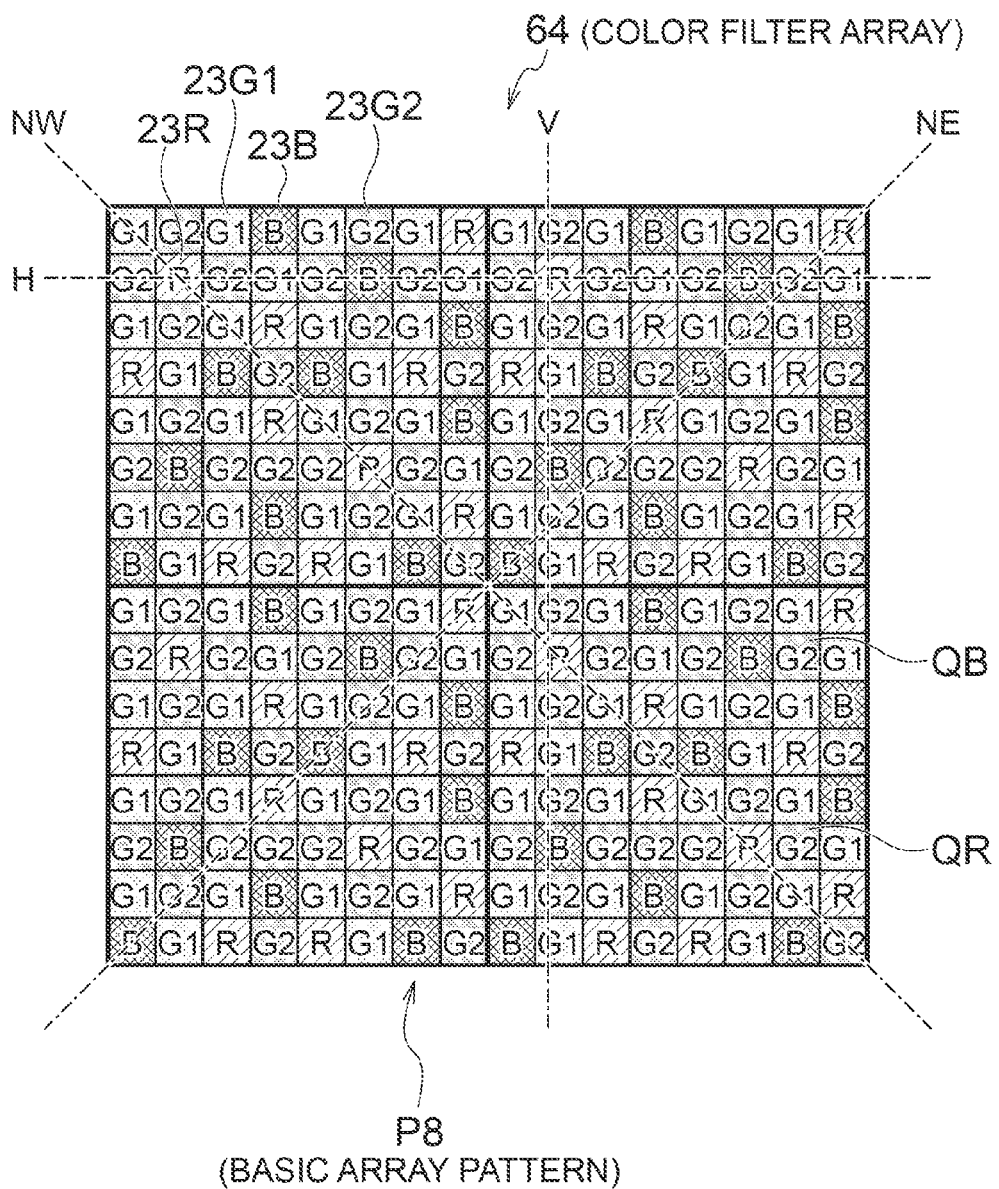
FIG. 21 is a front view of a color filter array according to an eighth embodiment.

Referring now back to FIG. 21, as described above, the color filter array 64 is basically the same as the color filter array 22 of the first embodiment except for having each of the G filters 23G1 and 23G2, and thus has the similar features (2) to (6) to the color filter array 22 of the first embodiment. Thus, the color filter array 64 can obtain the similar effects to the effects described in the first embodiment.

Note that the arrangement and the number of each of the G filters 23G1 and 23G2 are not limited to those of the embodiment illustrated in FIG. 21, but may be appropriately changed. In addition, the number of types of G filters may be increased to three or more.

[Color Imaging Element of Ninth Embodiment]

Next, with reference to FIG. 23, a color imaging element of the ninth embodiment of the present invention will be described. Note that the color imaging element of the ninth embodiment has basically the same configuration as the configuration of the color imaging element of the aforementioned first embodiment except for having an E pixel receiving light of an emerald (E) color corresponding to the fourth color of the present invention in addition to the RGB pixels. For this reason, the same reference numerals or characters are assigned to the same functions and configurations as the functions and the configurations of the above described first embodiment, and description thereof is omitted.

[Color Filter Array of Ninth Embodiment]

The color imaging element of the ninth embodiment has a color filter array 66 different from the color filter array of the first embodiment. The color filter array 66 includes a basic array pattern P9 having the RGB filters 23R, 23G, and 23B, and E filters 23E (first filters) arranged in an array pattern corresponding to 8×8 pixels, and the basic array pattern P9 is repeatedly placed in the horizontal and vertical directions (H and V). For this reason, the color filter array 66 has the above-described feature (1).

The basic array pattern P9 has an array pattern formed by replacing each transparent filter 23W in the basic array pattern P7 of the seventh embodiment illustrated in FIG. 19 with an E filter 23E. As described above, the color filter array 66 uses four types of colors obtained by replacing some of the G filters 23G with E filters 23E, which can improve the reproduction of high frequency components of brightness, reduce jagginess, and improve the perceived resolution.

Figure 24:
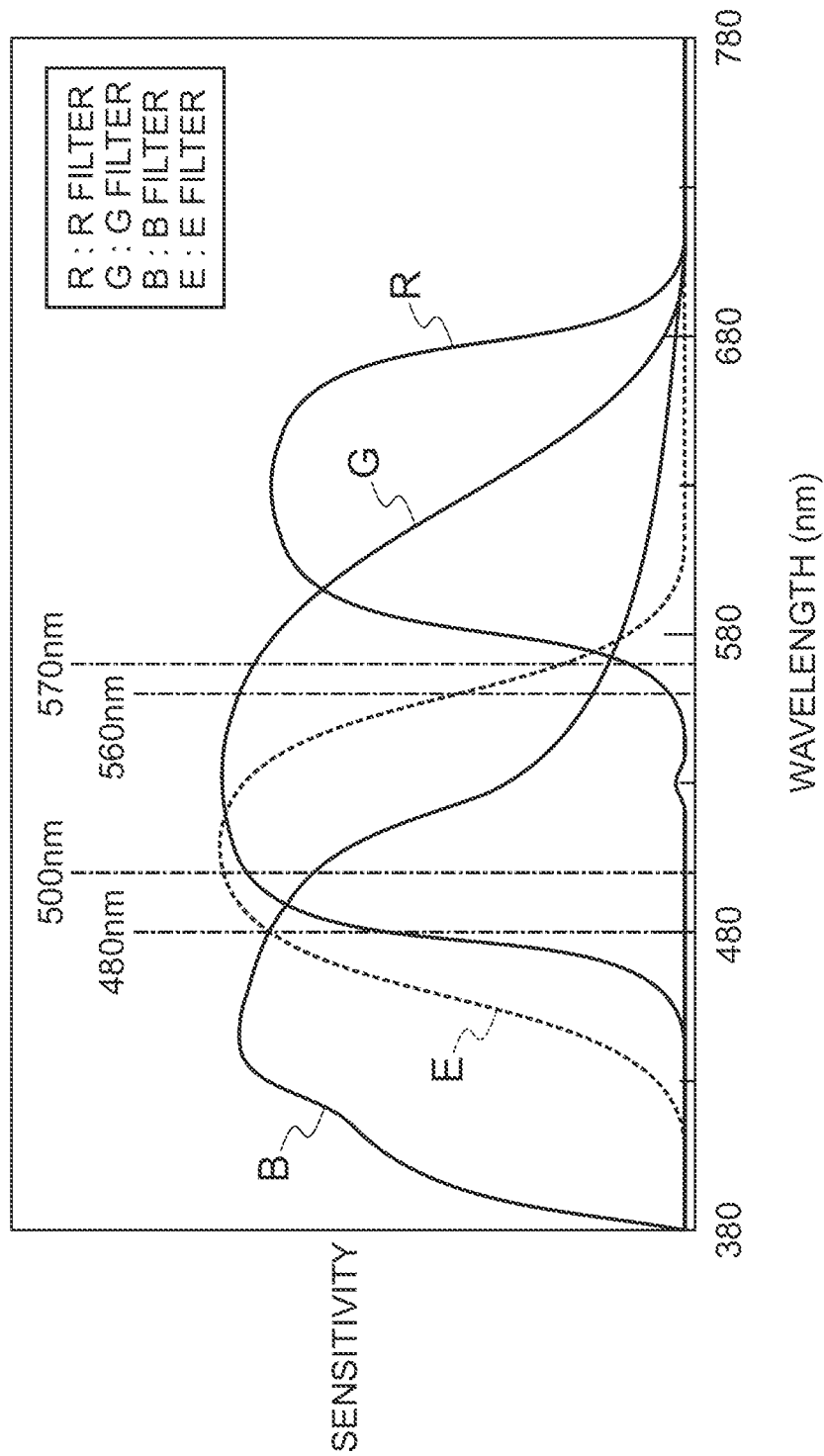
FIG. 24 is a graph illustrating spectral sensitivity characteristics of the color filter array according to the ninth embodiment.

In FIG. 24 illustrating the spectral sensitivity characteristics of the color filter array 66, the peak transmittance of the E filter 23E (peak sensitivity of the E pixel) is in a range from a wavelength of 480 nm or more to 570 nm or less. In addition, the transmittance of the E filter 23E is in a range from a wavelength of 500 nm or more to 560 nm or less, which is higher than the transmittance of each of the RB filters 23R and 23B. For this reason, the E filter 23E satisfies the aforementioned conditions (2) and (3). Note that the color filter array 66 replaces some of the G filters 23G corresponding to the G color contributing most to the brightness signal among the three primary colors of RGB with E filters 23E and thus also satisfies the aforementioned condition (4).

Note that in the spectral characteristics illustrated in FIG. 24, the E filter 23E has a peak closer to a short wavelength side than a peak of the G filter 23G, but may have a peak closer to a long wavelength side than the peak of the G filter 23G (the color appears to be a little closer to yellow) in some cases. As described above, a filter satisfying each condition of the present invention can be selected as the E filter 23E. For example, an E filter 23E satisfying the condition (1) can be selected.

Figure 23:
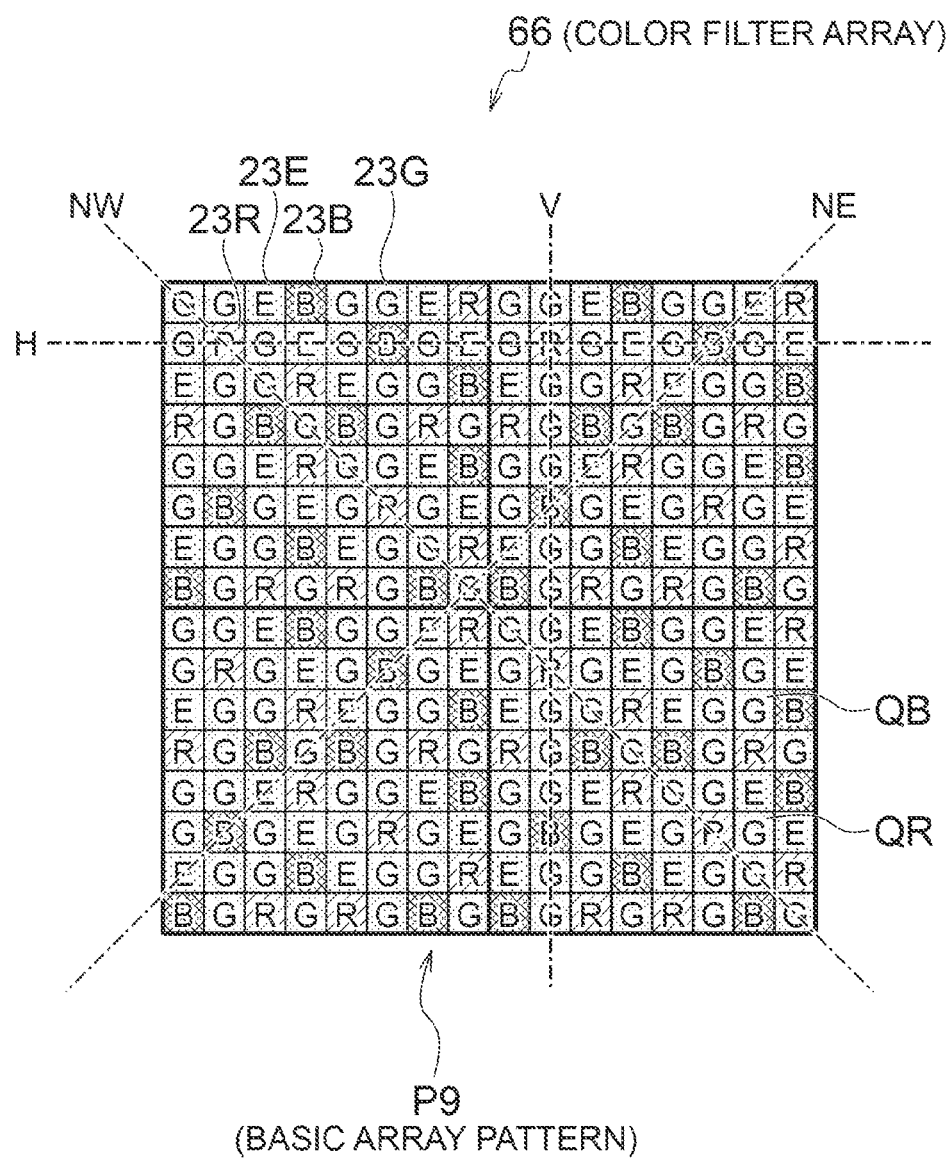
FIG. 23 is a front view of a color filter array according to a ninth embodiment.

Referring now back to FIG. 23, as described above, the color filter array 66 is basically the same as the color filter array 32 of the third embodiment except for replacing some of the G filters 23G with E filters 23E, and thus has the aforementioned features (2) to (6). Thus, the color filter array 66 can obtain the similar effects to the effects described in the third embodiment.

Note that the arrangement and the number of E filters 23E may be different from the arrangement and the number of the embodiment illustrated in FIG. 23. In this case, if one or more first filters including a G filter 23G and an E filter 23E are included in the filter line in each direction of the horizontal direction, the vertical direction, and the diagonal directions (NE and NW) of the color filter array 66, the first filters satisfy the aforementioned feature (2).

Note that the aforementioned ninth embodiment uses the E filter 23E as the first filter of the present invention, but for example, some of the E filters 23E do not satisfy the aforementioned conditions (1) to (4). Thus, such E filters 23E may be used as the second filter of the present invention.

[Others]

The basic array pattern of each color filter array of the above-described each embodiment includes an array pattern corresponding to the 10×10 pixels or 8×8 pixels, but for example, the color filter array may include a basic array pattern corresponding to 8×10 pixels, 10×8 pixels, 9×10 pixels, 10×9 pixels, 8×9 pixels, or 9×8 pixels. In addition, the basic array pattern may include an array pattern corresponding to more than 10 pixels in the first direction H and in the second direction V.

Figure 25:
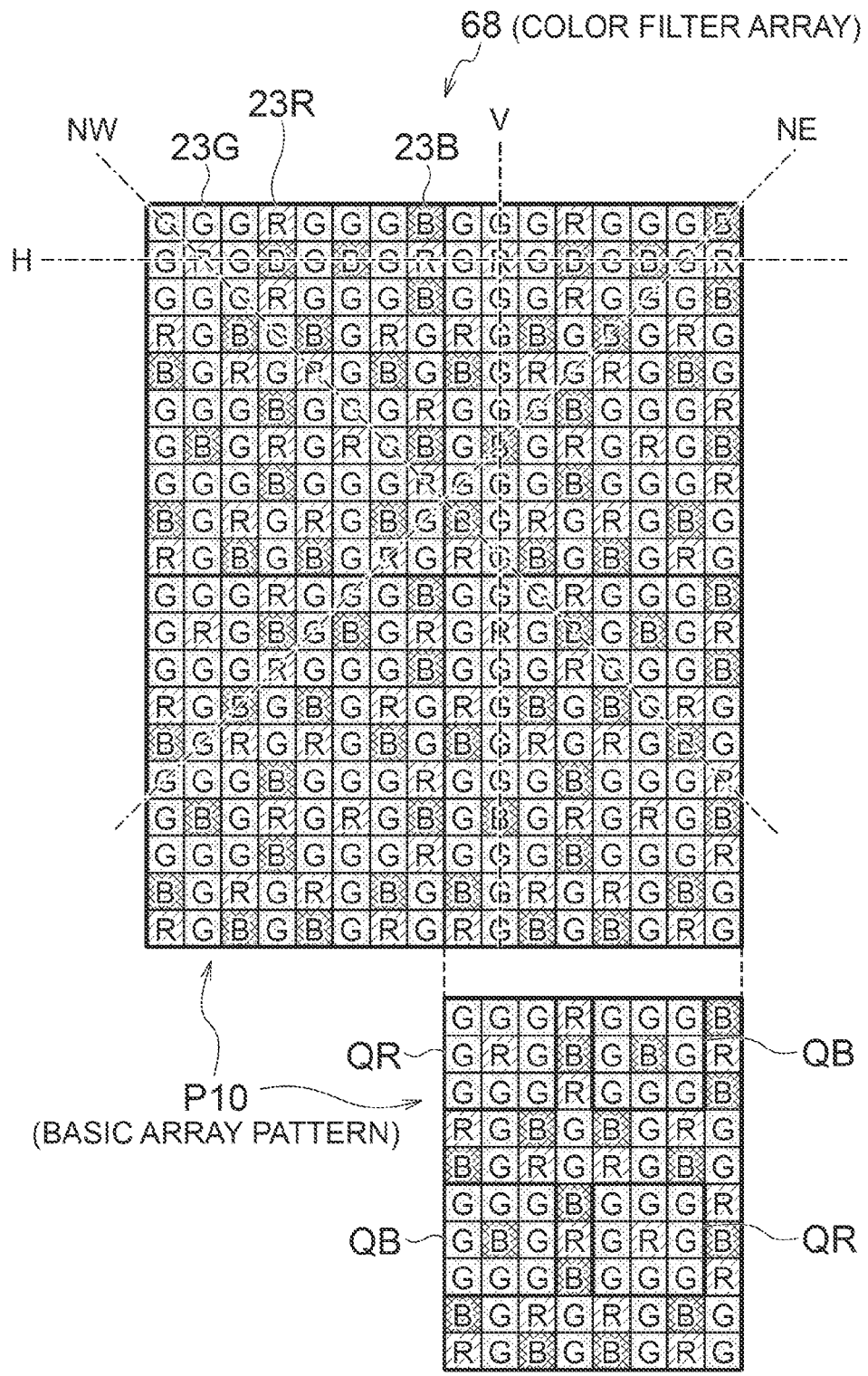
FIG. 25 is a front view illustrating an example of a color filter array having a basic array pattern corresponding to 8×10 pixels.

The basic array pattern P10 of the color filter array 68 illustrated in FIG. 25 includes an array pattern of 8×10 pixels. The color filter array 68 having the basic array pattern P10 has the aforementioned features (1) to (7).

Note that although not illustrated, the basic array pattern of each embodiment may be changed to another array pattern corresponding to M pixels×N pixels (each of M and N is 8 or more). However, an increase in each value of M and N complicates the signal processing such as the demosaicing processing. Thus, in order to prevent the complication of the signal processing, it is preferable that the size of the basic array pattern is not too large such as 12 pixels or less×12 pixels or less.

In each color filter array of the aforementioned each embodiment, the color filter of each color includes a basic array pattern two-dimensionally arrayed in the horizontal direction (H) and in the vertical direction (V), and the basic array pattern is repeatedly placed in the horizontal direction (H) and in the vertical direction (V), but the present invention is not limited to this.

Figure 26:
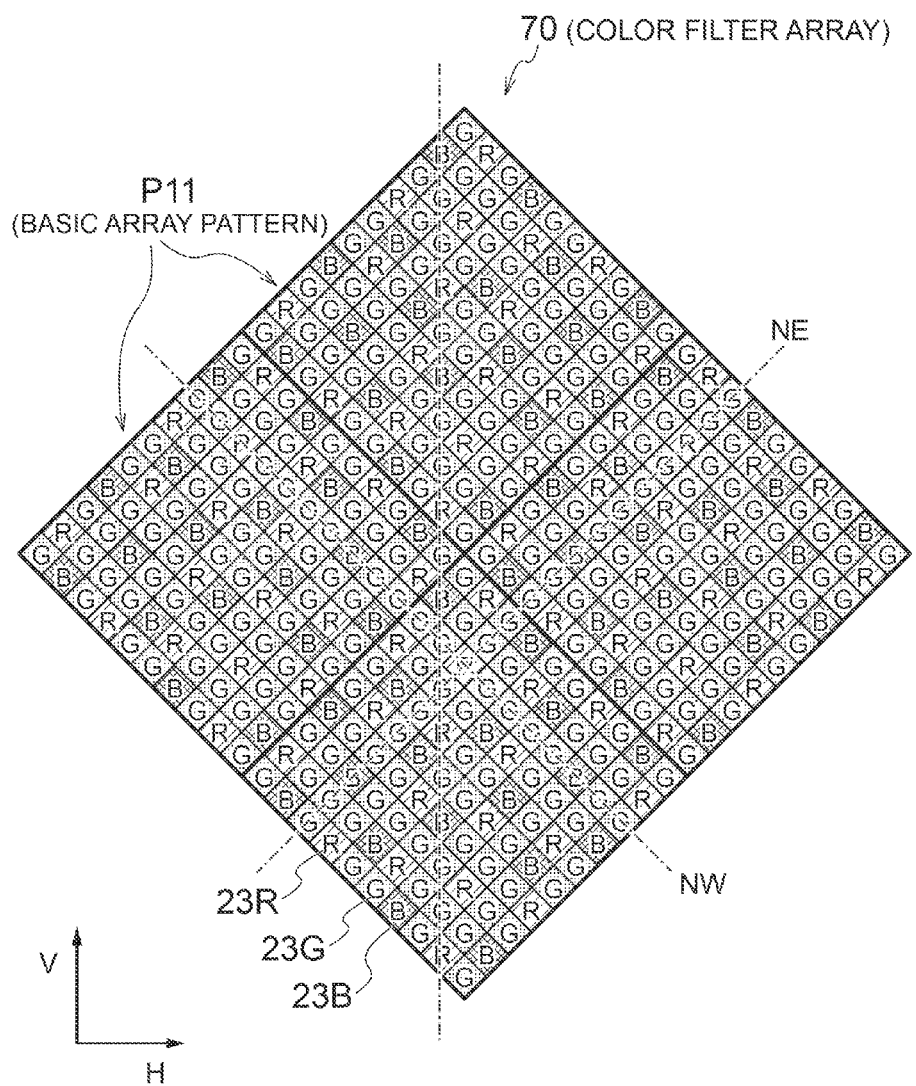
FIG. 26 is a front view illustrating an example of a color filter array configured as a honeycomb array according to other embodiment.
Figure 27:
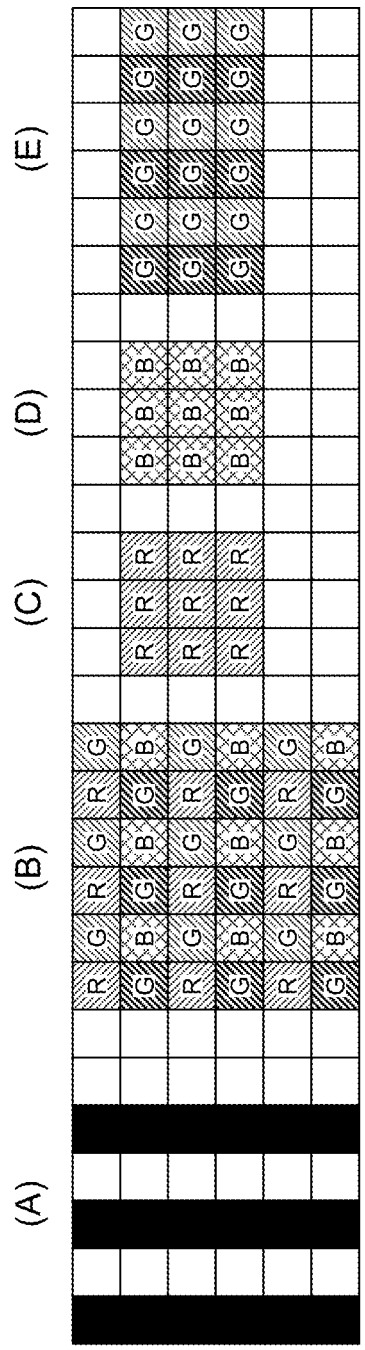
FIG. 27 is a view used to explain a problem of the color imaging element having a color filter in the conventional Bayer array.
Figure 28:
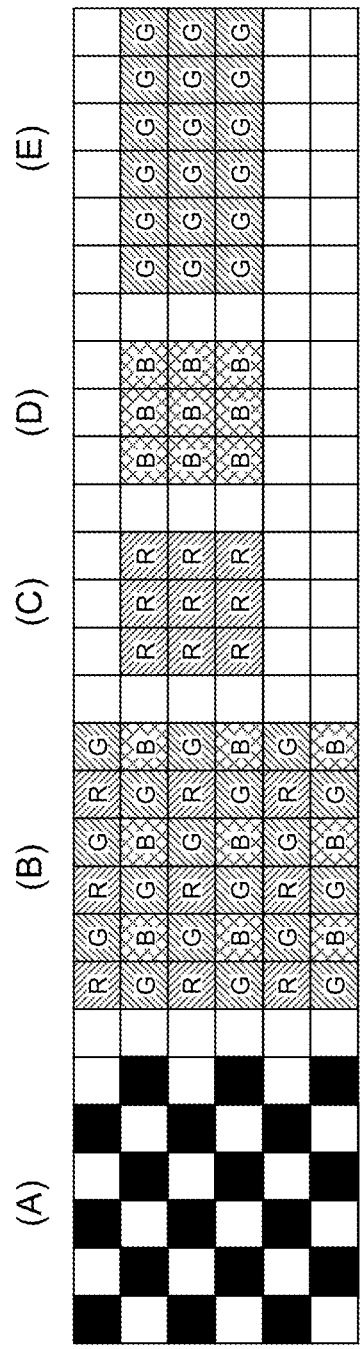
FIG. 28 is another view used to explain a problem of the color imaging element having a color filter in the conventional Bayer array.

For example, like a color filter array 70 illustrated in FIG. 26, the array pattern may be such that the array pattern includes a basic array pattern P11 in a so-called honeycomb array formed by two-dimensionally placing the RGB filters 23R, 23G and 23B in the diagonal directions (NE and NW), and the basic array pattern P11 is repeatedly placed in the diagonal directions (NE and NW). In this case, the diagonal directions (NE and NW) correspond to the first direction and the second direction of the present invention respectively; and the horizontal direction and the vertical direction correspond to the third direction and the fourth direction of the present invention respectively.

The color filter array 70 has an array pattern obtained by rotating the color filter array 22 of the first embodiment by 45° around the optical axis of the imaging optical system 10, and thus has the similar features (1) to (6) to the color filter array 22 of the first embodiment. Although not illustrated, the basic array patterns P2 to P10 may also be a honeycomb array as described above.

The first embodiment has described as the color filter array including an RGB primary color filter, but for example, the present invention can be applied to a color filter array including complementary color filters corresponding to four RGB complementary colors: cyan (C), magenta (M) and yellow (Y), and green (G). Also in this case, a color filter satisfying any of the aforementioned conditions (1) to (4) corresponds to the first filter of the present invention and the other color filters correspond to the second filter of the present invention.

As described above, the color filter array of the present embodiment can simplify demosaicing processing in a subsequent stage; can improve reproduction precision of the demosaicing processing in a high frequency region; can suppress aliasing and improve high frequency reproducibility at the demosaicing processing; can improve the precision of the demosaicing processing of the R pixels and the B pixels; can achieve high resolution; and can determine the highly correlated direction.

Note that the color filter array of the color imaging element of the present invention is not limited to the above-described embodiments, but it will be apparent that various modifications can be made to the present invention without departing from the spirit and scope of the present invention. For example, the color filter array of the aforementioned each embodiment may be appropriately combined. In addition, a filter combining at least any two types of filters selected from among the G filters 23G, the transparent filters 23W, the first and second G filters 23G1 and the 23G2, E filters 23E may be used as the first filters of the present invention, or a filter of the other color satisfying any of the aforementioned conditions (1) to (4) may be used. Further, a color filter other than the RB filters 23R and 23B may be used as the second filter of the present invention.

The above each embodiment has described the color imaging element to be mounted on a digital camera, but for example, the present invention can be applied to a color imaging element to be mounted on various electronic devices (imaging devices) having an imaging function such as smartphones, mobile phones, and PDAs.

What is claimed is:

1. A color imaging element as a single-plate color imaging element comprising:
   a plurality of pixels composed of photoelectric conversion elements disposed in a first direction and in a second direction perpendicular to the first direction; and
   color filters disposed on the plurality of pixels, wherein
   an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction,
   the basic array pattern includes a first filter corresponding to a first color having one or more colors and a second filter corresponding to a second color having two or more colors, in which a contribution ratio of the second color for acquiring a brightness signal is lower than the contribution ratio of the first color,
   the basic array pattern includes four or more square patterns corresponding to 3×3 pixels, each square pattern including one of the second filter in the center and eight of the first filters surrounding eight directions of the second filter,
   the array of the color filters includes therein a grating filter line in the first direction and a grating filter line in the second direction, in which the first filter and the second filter are placed side by side surrounding the four directions of the square pattern, and
   the array of the color filters includes therein the first filter disposed in each filter line in the first direction and in the second direction of the array of the color filters and in each filter line in a third direction and in a fourth direction inclined with respect to the first direction and the second direction,
   wherein in the basic array pattern, one or more second filters corresponding to each color of the second colors are placed in each filter line in the first direction and in the second direction in the basic array pattern.

2. The color imaging element according to claim 1, wherein the each value of M and N is 10, the grating filter line in the first direction and in the second direction is 2 pixels wide, and the second filter is disposed every second or third pixel in each of the first direction and the second direction.

3. The color imaging element according to claim 1, wherein the each value of M and N is 8, the grating filter line in the first direction and in the second direction is 1 pixel wide, and the first filter is disposed every second pixel in each of the first direction and the second direction.

4. The color imaging element according to claim 1, wherein in the basic array pattern, the grating filter line in the first direction and the grating filter line in the second direction have the same abundance ratio of a filter of each color of the second color.

5. The color imaging element according to claim 1, wherein at least one filter of the first color is placed adjacent to each side of the four sides of the square pattern, and a filter of each color of the second colors is disposed one by one adjacent to each side of the four sides of the square pattern.

6. The color imaging element according to claim 1, wherein in the array of the color filters, the color of the second filter placed at a center of each square pattern is different from each other among the square patterns closest to each other in each of the first direction and the second direction.

7. The color imaging element according to claim 1, wherein in the array of the color filters, a pixel of each color of the second filter placed at the center of the square pattern has the same abundance ratio.

8. The color imaging element according to claim 1, wherein if the color filter is square, the third direction and the fourth direction are inclined by 45° with respect to the first direction and the second direction respectively.

9. The color imaging element according to claim 1, wherein the first color includes at least any of green and transparent.

10. The color imaging element according to claim 1, wherein the second color includes red and blue.

11. A color imaging element as a single-plate color imaging element comprising:
    a plurality of pixels composed of photoelectric conversion elements disposed in a first direction and in a second direction perpendicular to the first direction; and
    color filters disposed on the plurality of pixels, wherein
    an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction,
    the basic array pattern includes a first filter corresponding to a first color having one or more colors, in which a peak transmittance of the first filter is in a range of 480 nm or more and 570 nm or less, and a second filter corresponding to a second color having two or more colors, in which the peak transmittance of the second filter is outside the range,
    the basic array pattern includes a plurality of square patterns of 3×3 pixels, each square pattern including one of the second filter in the center and eight of the first filters surrounding eight directions of the second filter,
    the basic array pattern includes four or more square patterns corresponding to 3×3 pixels, each square pattern including one of the second filter in the center and eight of the first filters surrounding eight directions of the second filter,
    the array of the color filters includes therein a grating filter line in the first direction and a grating filter line in the second direction, in which the first filter and the second filter are placed side by side surrounding the four directions of the square pattern, and
    the array of the color filters includes therein the first filter disposed in each filter line in the first direction and in the second direction of the array of the color filters and in each filter line in a third direction and in a fourth direction inclined with respect to the first direction and the second direction,
    wherein in the basic array pattern, one or more second filters corresponding to each color of the second colors are placed in each filter line in the first direction and in the second direction in the basic array pattern.

12. The color imaging element according to claim 11, wherein the each value of M and N is 10, the grating filter line in the first direction and in the second direction is 2 pixels wide, and the second filter is disposed every second or third pixel in each of the first direction and the second direction.

13. The color imaging element according to claim 11, wherein the each value of M and N is 8, the grating filter line in the first direction and in the second direction is 1 pixel wide, and the first filter is disposed every second pixel in each of the first direction and the second direction.

14. A color imaging element as a single-plate color imaging element comprising:
 a plurality of pixels composed of photoelectric conversion elements disposed in a first direction and in a second direction perpendicular to the first direction; and
 color filters disposed on the plurality of pixels, wherein
 an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction,
 the basic array pattern includes a first filter corresponding to a first color having one or more colors and a second filter corresponding to a second color having two or more colors, in which a peak transmittance of the second filter is lower than the peak transmittance of the first filter in a range of wavelength from 500 nm or more and 560 nm or less,
 the basic array pattern includes four or more square patterns of 3×3 pixels, each square pattern including one of the second filter in the center and eight of the first filters surrounding eight directions of the second filter,
 the basic array pattern includes four or more square patterns corresponding to 3×3 pixels, each square pattern including one of the second filter in the center and eight of the first filters surrounding eight directions of the second filter,
 the array of the color filters includes therein a grating filter line in the first direction and a grating filter line in the second direction, in which the first filter and the second filter are placed side by side surrounding the four directions of the square pattern, and
 the array of the color filters includes therein the first filter disposed in each filter line in the first direction and in the second direction of the array of the color filters and in each filter line in a third direction and in a fourth direction inclined with respect to the first direction and the second direction,
 wherein in the basic array pattern, one or more second filters corresponding to each color of the second colors are placed in each filter line in the first direction and in the second direction in the basic array pattern.

15. The color imaging element according to claim 14, wherein the each value of M and N is 10, the grating filter line in the first direction and in the second direction is 2 pixels wide, and the second filter is disposed every second or third pixel in each of the first direction and the second direction.

16. The color imaging element according to claim 14, wherein the each value of M and N is 8, the grating filter line in the first direction and in the second direction is 1 pixel wide, and the first filter is disposed every second pixel in each of the first direction and the second direction.

17. A color imaging element as a single-plate color imaging element comprising:
 a plurality of pixels composed of photoelectric conversion elements disposed in a first direction and in a second direction perpendicular to the first direction; and
 color filters disposed on the plurality of pixels, wherein
 an array of the color filters includes a basic array pattern having the color filters arranged in an array pattern corresponding to M×N (each value of M and N is 8 or more) pixels in the first direction and in the second direction, and the basic array pattern is repeatedly placed in the first direction and in the second direction,
 the basic array pattern includes a first filter corresponding to a first color having two or more colors including a color contributing most to a brightness signal among three primary colors and a fourth color other than the three primary colors, and a second filter corresponding to a second color having two or more colors other than the first color,
 the basic array pattern includes four or more square patterns corresponding to 3×3 pixels, each square pattern including one of the second filter in the center and eight of the first filters surrounding eight directions of the second filter,
 the array of the color filters includes therein a grating filter line in the first direction and a grating filter line in the second direction, in which the first filter and the second filter are placed side by side surrounding the four directions of the square pattern, and
 the array of the color filters includes therein the first filter disposed in each filter line in the first direction and in the second direction of the array of the color filters and in each filter line in a third direction and in a fourth direction inclined with respect to the first direction and the second direction,
 wherein in the basic array pattern, one or more second filters corresponding to each color of the second colors are placed in each filter line in the first direction and in the second direction in the basic array pattern.

18. The color imaging element according to claim 17, wherein the each value of M and N is 10, the grating filter line in the first direction and in the second direction is 2 pixels wide, and the second filter is disposed every second or third pixel in each of the first direction and the second direction.

19. The color imaging element according to claim 17, wherein the each value of M and N is 8, the grating filter line in the first direction and in the second direction is 1 pixel wide, and the first filter is disposed every second pixel in each of the first direction and the second direction.

20. An imaging device comprising
 an imaging optical system,
 a color imaging element forming a subject image through the imaging optical system, and
 an image data generation unit generating image data representing the formed subject image, wherein
 the color imaging element is the color imaging element according to claim 1.

* * * * *